(12) United States Patent  (10) Patent No.: US 7,698,798 B2
Toosky  (45) Date of Patent: *Apr. 20, 2010

(54) PUSH-TYPE RIVETLESS NUT PLATE AND METHOD AND APPARATUS FOR INSTALLING SAME

(75) Inventor: Rahmatollah F. Toosky, San Clemente, CA (US)

(73) Assignee: SPS Technologies, LLC, Jenkintown, PA (US)

( * ) Notice: Subject to any disclaimer, the term of this patent is extended or adjusted under 35 U.S.C. 154(b) by 804 days.

This patent is subject to a terminal disclaimer.

(21) Appl. No.: 11/466,872

(22) Filed: Aug. 24, 2006

(65) Prior Publication Data

US 2006/0283003 A1 Dec. 21, 2006

Related U.S. Application Data

(60) Division of application No. 10/929,701, filed on Aug. 30, 2004, now Pat. No. 7,114,900, which is a continuation-in-part of application No. 10/272,721, filed on Oct. 17, 2002, now Pat. No. 7,059,816.

(60) Provisional application No. 60/345,105, filed on Nov. 9, 2001.

(51) Int. Cl.
  *B23P 11/00* (2006.01)
  *B23P 19/02* (2006.01)
  *B21D 39/00* (2006.01)

(52) U.S. Cl. .......................... 29/523; 29/432; 29/432.1; 29/432.2; 29/522.1; 29/525; 411/108

(58) Field of Classification Search .................. 29/432, 29/432.1, 432.2, 509, 512, 521, 522.1, 523, 29/525, 525.01, 525.02, 525.06, 525.11; 269/54.1; 411/108, 180, 181

See application file for complete search history.

(56) References Cited

U.S. PATENT DOCUMENTS

| 177,665 | A | 5/1876 | Smith |
| 1,107,544 | A | 8/1914 | Ogden |
| 1,136,345 | A | 5/1915 | Zifferer |
| 1,413,998 | A | 4/1922 | Templeton |

(Continued)

FOREIGN PATENT DOCUMENTS

| CH | 277209 | 8/1951 |
| DE | 1055718 | 4/1959 |
| FR | 2740184 | 4/1997 |
| GB | 495976 | 11/1938 |
| SE | 482929 | 1/1970 |

OTHER PUBLICATIONS

Aerospace Fasteners Numerical Listing of Parts 1995 Edition 21pages.
Fatigue Improvement by Sleeve Coldworking by Joseph L. Phillips, Oct. 1973—13 pages.

*Primary Examiner*—David P Bryant
*Assistant Examiner*—Alexander P Taousakis
(74) *Attorney, Agent, or Firm*—Trexler, Bushnell, Giangiorgi, Blackstone & Marr, Ltd.

(57) ABSTRACT

A rivetless nut plate has a nut, a holding bracket, a member and a nut retainer. The nut is provided with an aperture therethrough and is secured within a bracket portion of the holding bracket by the retainer but also is permitted limited movement within the bracket portion. The holding bracket further includes a tubular portion having inner and outer walls. The inner wall is tapered such that the member is positioned against the inner wall. Upon an axial force being applied to the member through the aperture of the nut, the member is pushed through the tubular portion from the first end to the second end in order to expand the inner wall and force the outer wall into engagement with the wall of the workpiece. A tool is provided to push the member through the tubular member and can be incorporated into either a manual or automatic process.

14 Claims, 23 Drawing Sheets

U.S. PATENT DOCUMENTS

| | | |
|---|---|---|
| 1,966,835 A | 7/1934 | Stites |
| 2,078,411 A | 4/1937 | Richardson |
| 2,092,358 A * | 9/1937 | Robertson .................. 285/213 |
| 2,146,461 A | 2/1939 | Bettington |
| 2,150,361 A | 3/1939 | Chobert |
| 2,249,923 A | 7/1941 | Whitcombe |
| 2,304,107 A | 12/1942 | Leisure |
| 2,333,386 A | 11/1943 | Murphy |
| 2,366,965 A | 1/1945 | Johnson |
| 2,413,669 A | 12/1946 | Whitcombe |
| 2,421,201 A | 5/1947 | Hallock |
| 2,438,044 A | 3/1948 | Freesz |
| 2,477,429 A | 7/1949 | Swanstrom et al. |
| 2,560,961 A | 7/1951 | Knohl |
| 2,649,883 A | 8/1953 | Sharp |
| 2,802,503 A | 8/1957 | Zupa |
| 2,825,380 A | 3/1958 | Reiner |
| 2,976,080 A | 3/1961 | Moore |
| 2,986,188 A | 5/1961 | Karp et al. |
| 3,025,897 A | 3/1962 | Gieleghem |
| 3,126,039 A | 3/1964 | Fiddler |
| 3,177,916 A | 4/1965 | Rosan |
| 3,180,387 A | 4/1965 | Dzus et al. |
| 3,305,987 A | 2/1967 | Weaver |
| 3,316,953 A | 5/1967 | Fransson et al. |
| 3,537,499 A | 11/1970 | Dey et al. |
| 3,556,570 A | 1/1971 | Gosenza |
| 3,566,662 A | 3/1971 | Champoux |
| 3,657,957 A | 4/1972 | Siebol |
| 3,670,796 A | 6/1972 | Grimm |
| 3,695,324 A | 10/1972 | Gulistan |
| 3,698,278 A | 10/1972 | Trembley |
| 3,765,078 A | 10/1973 | Gulistan |
| 3,785,421 A | 1/1974 | Launay |
| 3,825,146 A | 7/1974 | Hirmann |
| 4,015,650 A | 4/1977 | Anderson |
| 4,164,807 A | 8/1979 | King, Jr. |
| 4,186,787 A | 2/1980 | Husain |
| 4,187,708 A | 2/1980 | Champoux |
| 4,193,435 A | 3/1980 | Frosch et al. |
| 4,227,561 A | 10/1980 | Molina |
| 4,295,766 A | 10/1981 | Shaw |
| 4,405,256 A | 9/1983 | King, Jr. |
| 4,423,619 A | 1/1984 | Champoux |
| 4,425,780 A | 1/1984 | Champoux |
| 4,471,643 A | 9/1984 | Champoux et al. |
| 4,557,033 A | 12/1985 | Champoux |
| 4,557,650 A | 12/1985 | Molina |
| 4,695,212 A | 9/1987 | Berecz |
| 4,732,518 A | 3/1988 | Toosky |
| 4,762,451 A | 8/1988 | Collins |
| 4,768,907 A | 9/1988 | Gauron |
| 4,781,501 A | 11/1988 | Jeal et al. |
| 4,790,701 A | 12/1988 | Baubles |
| 4,826,374 A | 5/1989 | Baglin |
| 4,828,440 A | 5/1989 | Anderson et al. |
| 4,830,557 A | 5/1989 | Harris et al. |
| 4,863,327 A | 9/1989 | Poupiter |
| 4,875,816 A | 10/1989 | Peterson |
| 4,884,420 A | 12/1989 | Finkel et al. |
| 4,885,829 A | 12/1989 | Landy |
| 4,895,484 A | 1/1990 | Wilcox |
| 4,934,170 A | 6/1990 | Easterbrook et al. |
| 4,934,886 A | 6/1990 | Aikens |
| 5,066,180 A | 11/1991 | Lang et al. |
| 5,078,294 A | 1/1992 | Staubli |
| 5,083,363 A | 1/1992 | Ransom et al. |
| 5,096,349 A | 3/1992 | Landy et al. |
| 5,096,350 A | 3/1992 | Peterson |
| 5,103,548 A | 4/1992 | Reid et al. |
| 5,127,254 A | 7/1992 | Copple et al. |
| 5,129,253 A * | 7/1992 | Austin et al. ............. 72/370.07 |
| 5,146,668 A | 9/1992 | Gulistan |
| 5,193,643 A | 3/1993 | McIntyre |
| 5,245,743 A | 9/1993 | Landy et al. |
| 5,305,627 A | 4/1994 | Quincey et al. |
| 5,341,559 A | 8/1994 | Reid et al. |
| 5,380,136 A | 1/1995 | Copple et al. |
| 5,405,228 A | 4/1995 | Reid et al. |
| 5,433,100 A | 7/1995 | Easterbrook et al. |
| 5,468,104 A | 11/1995 | Reid et al. |
| 5,630,686 A | 5/1997 | Billmann |
| 5,704,747 A | 1/1998 | Hutter et al. |
| 5,716,178 A | 2/1998 | Vu |
| 5,893,694 A | 4/1999 | Wilusz et al. |
| 5,947,518 A | 9/1999 | Redman et al. |
| 6,077,010 A | 6/2000 | Reid et al. |
| 6,146,071 A | 11/2000 | Norkus et al. |
| 6,183,180 B1 | 2/2001 | Copple et al. |
| 6,289,577 B1 * | 9/2001 | Tanaka et al. ............. 29/603.03 |
| 7,237,314 B2 * | 7/2007 | Toosky .................... 29/525.02 |

* cited by examiner

PUSH-TYPE RIVETLESS NUT PLATE AND METHOD AND APPARATUS FOR INSTALLING SAME

CROSS-REFERENCE AND INCORPORATION BY REFERENCE

This patent application is a Divisional of U.S. patent application Ser. No. 10/929,701, filed Aug. 30, 2004 now U.S. Pat. No. 7,114,900, and entitled "Push-Type Rivetless Nut Plate And Method And Apparatus For Installing Same", which in turn, is a Continuation-In-Part of U.S. patent application Ser. No. 10/272,721, filed Oct. 17, 2002 now U.S. Pat. No. 7,059,816, and entitled "Nut Plate", which, in turn, claims the benefit of domestic priority of U.S. Provisional Application Ser. No. 60/345,105, filed Nov. 9, 2001, and entitled "Nutplate". The entireties of U.S. Continuation-In-Part patent application Ser. No. 10/929,701, U.S. patent application Ser. No. 10/272,721, and U.S. Provisional Application Ser. No. 60/345,105 are hereby incorporated by reference.

BACKGROUND OF THE INVENTION

The present invention relates to a rivetless nut plate typically used in the aerospace industry. More specifically, the present invention relates to a push-type rivetless nut plate and a method and apparatus for installing same.

Nut plates are used for attaching structural and non-structural components together in both aerospace and commercial applications. There are many different design configurations of nut plates being used today. Two major classes are riveted nut plates and rivetless nut plates.

In riveted nut plates, two or more rivets are employed for attaching the body of the nut plates to the workpieces.

Rivetless nut plates are composed fundamentally of three components: a nut element, a holding bracket, and an attachment sleeve. One method of attachment and fixing of these nut plates to workpieces is based on two major features:

(1) The insertion of the sleeve into an aperture of a workpiece by pressing in or pulling down the bracket sleeve assembly into the aperture of the workpiece. Serration/lobe features on the sleeve interfere with walls of the workpiece to provide resistance against the rotation of the nut plate.

(2) After insertion of the sleeve into the aperture of the workpiece, an end of the sleeve is flared against the opposite side of the workpiece providing resistance against push-out forces that are encountered during usage of the nut plate.

One example of this type of rivetless nut plate is embodied in U.S. Pat. No. 4,732,518 which illustrates the insertion of a sleeve inside a workpiece against heavy interference forces and then deformation of the sleeve to produce flaring of the end of the sleeve. The sleeve has a serration/lobe configuration thereon with the serration/lobe configuration being long and tapered such that the serrations/lobes extend into the walls of the workpiece. The tapered feature, length and specific geometry are necessary to make installation possible with the method of installation which was chosen for its application. The main object of the '518 patent with its tapered and extended serration/lobe configuration was to enhance the fatigue life of the workpiece by distributing the load throughout the workpiece and providing expansion due to the insertion of the sleeve into the workpiece, and to cold work the material adjacent the perimeter of the workpiece aperture.

The installation of rivetless nut plates with tooling of present designs, however, such as those discussed in U.S. Pat. No. 4,732,518, is cumbersome, slow, complicated, costly and often non-functional. Also, the hole preparation needs to be precise and requires countersinking or counterboring for flush installation. These shortcomings have limited the usage of rivetless nut plates.

The flaring of rivetless nut plates is also disadvantageous for many reasons, such as complicated tooling, special aperture preparation (such as counter-bore and counter-sink) to achieve flush installation, grip length limitations, the creation of gaps between the sleeve and the walls of the workpiece, and longer length, thus making the rivetless nut plate a relatively heavy component.

Four other rivetless nut plate designs are illustrated in U.S. Pat. Nos. 5,096,349, 5,245,743, 5,405,228 and 5,704,747, which were designed to avoid flaring, but each has disadvantages associated therewith. The design of U.S. Pat. No. 5,704,747, relies on adhesive for attaching the nut plate to the structure. The designs of U.S. Pat. Nos. 5,096,349, 5,245,743 and 5,405,228 do not have adhesives or lobes which are used to fix the nut plate within the structure. These designs rely on heavily cold-worked holes and high interference engagement utilizing a hardened pin as the installation tool to expand the sleeve portion into the structure. The sleeve is smooth and because of high level expansion, the friction of forces created is supposed to retain the nut plate and provide expected mechanical properties. The fundamental purpose for design of this fastener is to enhance mechanical fatigue properties of the joint. The parts for this design are very expensive, installation is costly and cumbersome, and hole preparation needs to be very precise. Thus, the overall cost of this design is very high and application is thereby limited. There are also reports in the field that because of the required heavy expansion the receiving structure can deform beyond acceptable limits, thereby causing damage and rejection of the hole structure.

In response to these disadvantages of the prior art rivetless nut plate designs, rivetless nut plates were designed to overcome these disadvantages and provide a rivetless nut plate which would simplify the installation of rivetless nut plates to workpieces. These rivetless nut plates are disclosed in United States Publication No. US-2003-0091408-A1, which is owned by the Assignee of the present application, and the disclosure of which is incorporated herein in its entirety. These rivetless nut plates overcame the disadvantages of the prior art rivetless nut plate designs, however, were still met with certain disadvantages. Namely, these rivetless nut plates incorporate an internal stem member which is of pull-type design. The assembly process involves inserting the stem from one side of the workpiece and then pulling the stem through the hole of the workpiece from the other side of the workpiece with a special tool. These stems in rivetless nut plates of the pull-type design make it difficult to integrate these rivetless nut plates into an automatic assembly process as access to both sides of the workpiece is needed. These rivetless nut plates also are limited in their size, can be expensive to make and use a large amount of material.

Thus, there is a need for a rivetless nut plate design which overcomes the disadvantages of the prior art rivetless nut plate designs. The present invention provides for such a rivetless nut plate design. The present invention further provides for a novel method and a novel apparatus for installing the rivetless nut plates of the present invention.

SUMMARY OF THE INVENTION

Briefly, and in accordance with the foregoing, the invention provides a rivetless nut plate which is adapted to be attached to a wall defined by an aperture through a workpiece. The nut plate includes a nut, a holding bracket, a member and a nut retainer. The nut is provided with an aperture therethrough and is secured within a bracket portion of the holding bracket by the retainer but also is permitted limited movement within the bracket portion. The holding bracket further includes a tubular portion having inner and outer walls. The inner wall is tapered such that the member is positioned against the inner wall. Upon an axial force being applied to the member through the aperture of the nut, the member is pushed through the tubular portion from the first end to the second end in order to expand the inner wall and force the outer wall into engagement with the wall of the workpiece. The member can be in the form of a spherical ball, a mandrel without a shank or a mandrel with a shank. A tool is provided to push the member through the tubular member and can be incorporated into either a manual or automatic process.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENTS

Figure 1:
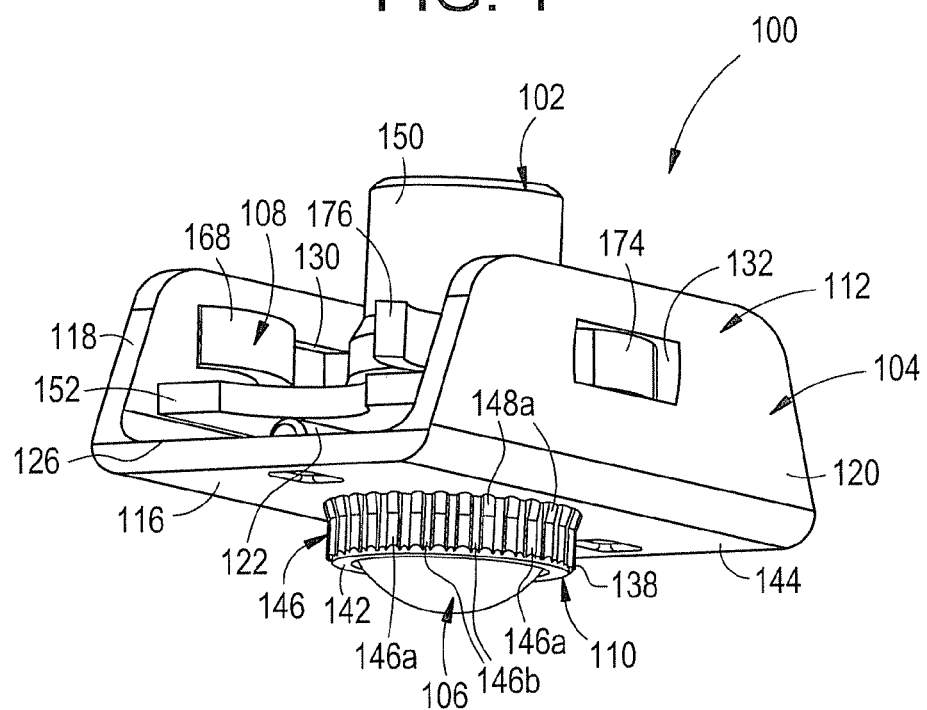
FIG. 1 is a perspective view of a nut plate of a first embodiment of the invention.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

A first embodiment of a nut plate 100 is shown in FIGS. 1-7, a second embodiment of a nut plate 300 is shown in FIGS. 8-14, and a third embodiment of the nut plate 500 is shown in FIGS. 15-21. Like elements are denoted with like reference numerals with the first embodiment being in the one hundreds, the second embodiment being in the three hundreds, and the third embodiment being in the five hundreds.

Attention is now directed to the nut plate 100 of the first embodiment of the invention as illustrated in FIGS. 1-7. The nut plate 100 of the first embodiment includes a nut 102, a holding bracket 104, a ball 106, and a retainer 108.

The holding bracket 104 is generally Y-shaped in side elevation and includes a tubular portion 110 and a bracket portion 112 which extends outwardly from the tubular portion 110 at a first end 114 thereof. The bracket portion 112 includes a base portion 116 and opposed upstanding side walls 118, 120. The base portion 116 has a pair of protrusions 122, 124 which protrude upwardly from the base portion 116. Protrusion 122 is provided proximate to edge 126 of the base portion 116 and protrusion 124 is provided proximate to edge 128 of the base portion 116. Slots 130, 132 extend through the side walls 118, 120 of the bracket portion 112.

The tubular portion 110 extends in the opposite direction from the base portion 116 of the bracket portion 112 than do the side walls 118, 120 and the protrusions 122, 124 of the bracket portion 112. The tubular portion 110 has an aperture 134 therethrough which defines an inner wall 136 of the tubular portion 110. The tubular portion 110 also has an outer wall 138. At the first end 114 of the tubular portion 110, the inner wall 136 defines a first inner diameter of the aperture 134. From the first end 114 of the tubular portion 110, the inner wall 136 curves inwardly to provide a shoulder 140 and to define a second inner diameter of the aperture 134 and thus a wall thickness of the tubular portion 110 between the outer wall 138 and the shoulder 140. The second inner diameter of the aperture 134 at the shoulder 140 of the tubular portion 110 is smaller than the first inner diameter of the aperture 134 at the first end 114 of the tubular portion 110. From the shoulder 140 to a second end 142 of the tubular portion 110, the inner wall 136 is tapered or stepped such that the inner wall 136 at the second end 142 of the tubular portion 110 defines a third inner diameter and thus a wall thickness of the tubular portion 110 at the second end 142 of the tubular portion 110. The wall thickness of the tubular portion 110 at the second end 142 of the tubular portion 110 is larger than the wall thickness of the tubular portion 110 between the outer wall 138 and the shoulder 140 of the tubular portion 110. The third inner diameter of the aperture 134 at the second end 142 of the tubular portion 110 is smaller than the second inner diameter of the aperture 134 at the shoulder 140 of the tubular portion 110.

Figure 2:
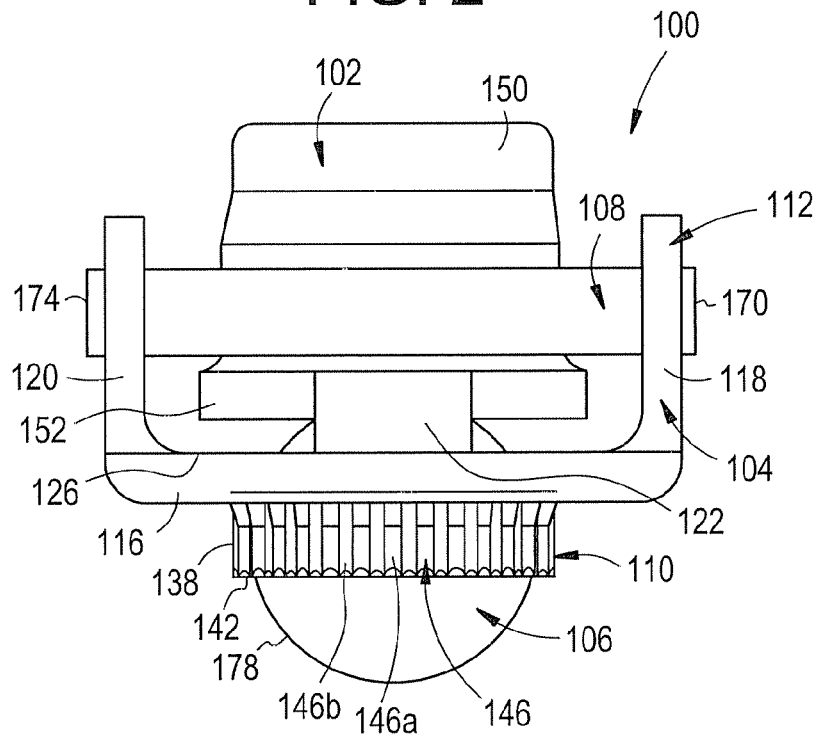
FIG. 2 is a side elevational view of the nut plate of the first embodiment of the invention.
Figure 3:
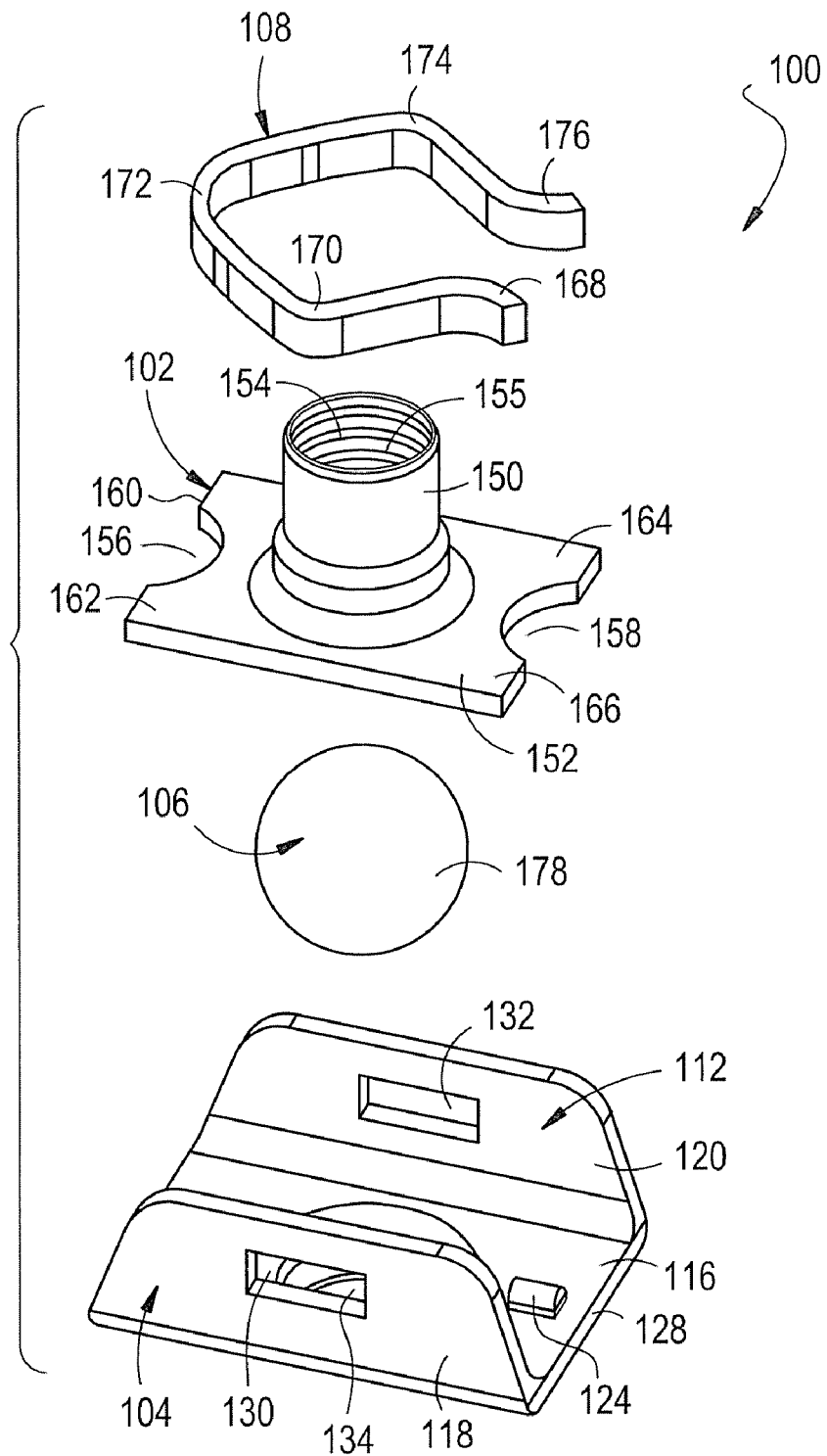
FIG. 3 is an exploded perspective view of the nut plate of the first embodiment of the invention.
Figure 4:
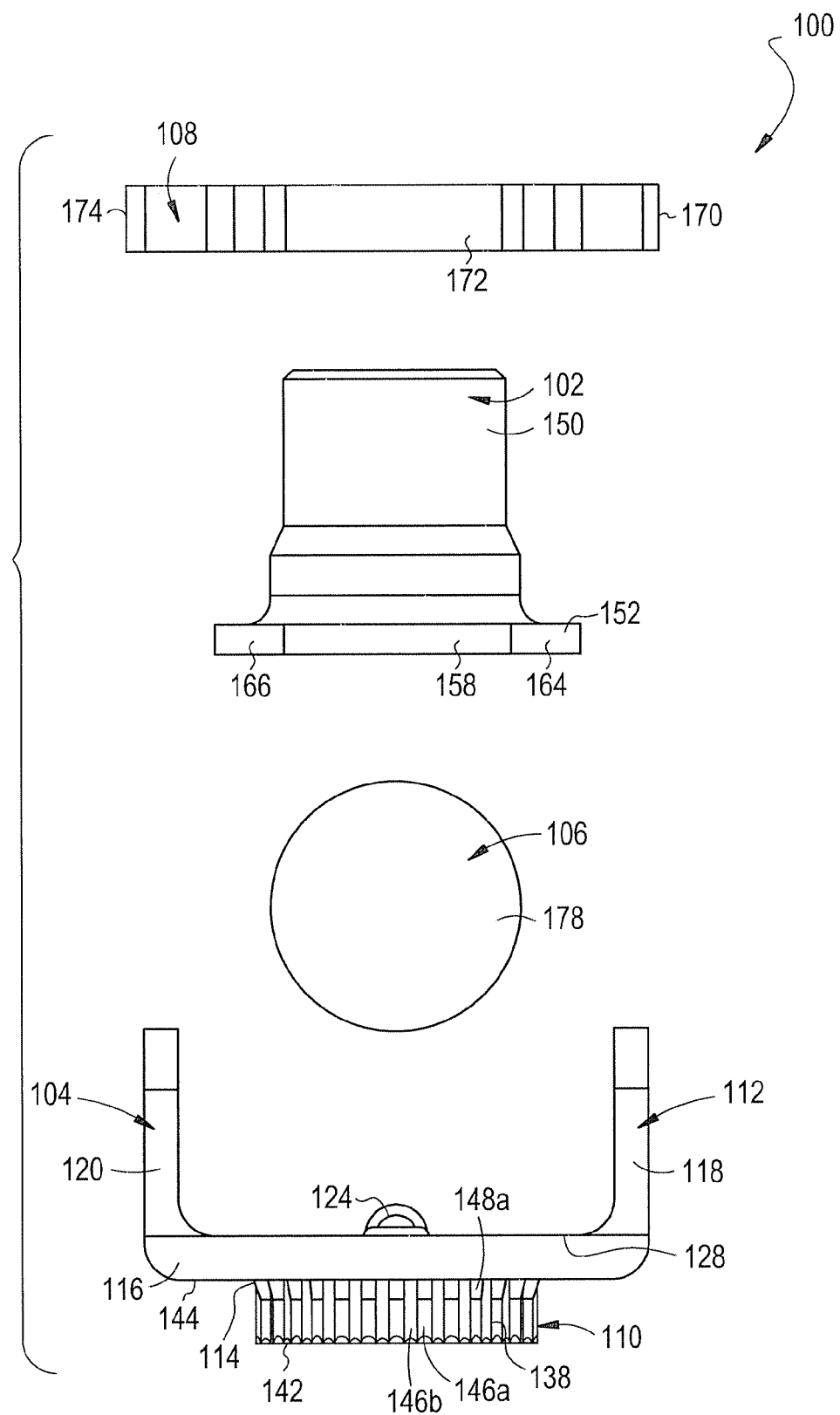
FIG. 4 is an exploded side elevational view of the nut plate of the first embodiment of the invention.

The outer wall 138 of the tubular portion 110 extends from an undersurface 144 of the bracket portion 112 to the second end 142 of the tubular portion 110. Lobes or ribs 146 extend outwardly from the outer wall 138 of the tubular portion 110. The lobes 146 can be formed in many different configurations on the outer wall 138, but, preferably, the lobes 146 are formed as best illustrated in FIGS. 1, 2 and 4. The lobes 146 are axially straight along the outer wall 138 such that they extend from the second end 142 of the tubular portion 110 to the undersurface 144 of the bracket portion 112. Two different types of lobes 146 are provided along the outer wall 138, namely high lobes 146a and low lobes 146b. The high lobes 146a extend outwardly from the outer wall 138 a greater distance than the low lobes 146b. The high lobes 146a and the low lobes 146b are preferably alternated around the outer wall 138 such that each high lobe 146a is positioned between two low lobes 146b and each low lobe 146b is positioned between two high lobes 146a. Each of the high lobes 146a also preferably have an angled portion 148a proximate to the undersurface 144 of the bracket portion 112 such that the high lobes 146a extend outwardly further from the outer wall 138 proximate to the undersurface 144 of the bracket portion 112 than proximate to the second end 142 of the tubular portion 110. The purpose of the lobes 146a, 146b will be discussed in further detail herein.

The nut 102 includes a cylindrical portion 150 and a flat base portion 152 which extends outwardly from the cylindrical portion 150 at one end thereof. The cylindrical portion 150 has an aperture 154 therethrough which defines an inner wall 155 of the cylindrical portion 150. The cylindrical portion 150 at the inner diameter is generally threaded such that a workpiece, such as a bolt, can be attached thereto. The flat base portion 152 includes end recesses 156, 158 and axially projecting end portions 160, 162 and 164, 166 situated on opposite sides of the recesses 156, 158, respectively. The recesses 156, 158 are sized to accept the protrusions 122, 124 of the holding bracket 104.

The retainer 108 may be a spring formed from rectangular wire bent into the form illustrated. Retainer 108 is preferably one piece and extends from end portion 168 to side portion 170, then to middle portion 172, then to side portion 174, and then to end portion 176. The operation and purpose of the retainer 108 will be discussed further herein.

The ball 106 is spherical and has a diameter which is smaller than the first inner diameter of the tubular portion 110 but larger than the second inner diameter of the tubular portion 110. The ball 106 is formed of a material which is stronger than that which the tubular portion 110 of the holding bracket 104 is formed from.

Figure 5:
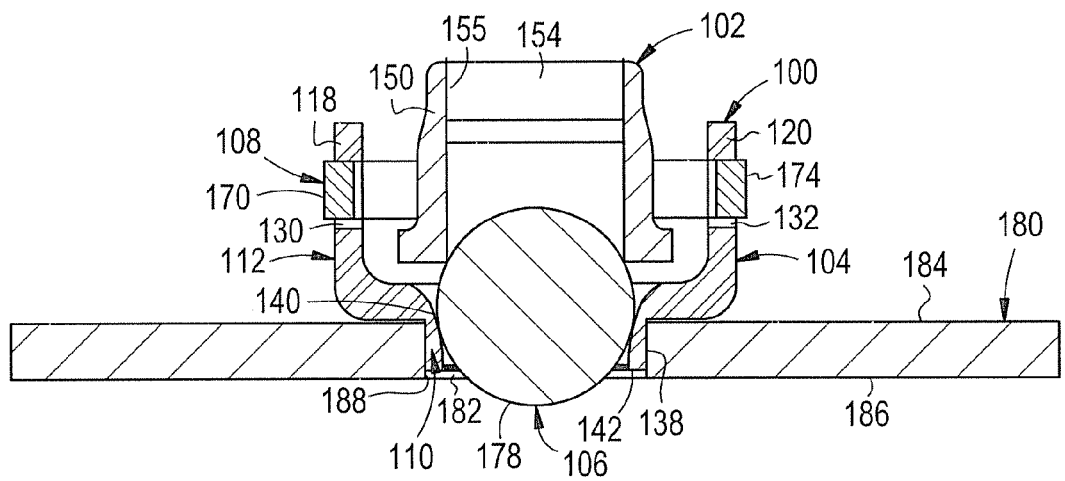
FIGS. 5-7 are side elevational cross-sectional views of the nut plate of the first embodiment of the invention being attached to the workpiece.

In order to assemble the nut plate 100, the ball 106 is inserted into the aperture 134 of the tubular portion 110 of the holding bracket 104 at the first end 114 thereof until an outer surface 178 of the ball 106 meets resistance from the shoulder 140 of the inner wall 136 of the tubular portion 110, as illustrated in FIG. 5.

The nut 102 is then connected to the holding bracket 104 by positioning the aperture 154 of the cylindrical portion 150 of the nut 102 over the ball 106 and lowering the nut 102 until the nut 102 meets resistance from the outer surface 178 of the ball 106, such that a portion of the ball 106 will be positioned within the aperture 150 of the cylindrical portion 150 of the nut 102, between the inner wall 155 of the nut 102. The nut 102 is also positioned such that the protrusions 122, 124 on the base portion 116 are positioned within/or below the recesses 156, 158 of the nut 102.

The retainer 108 is then attached to the bracket portion 112 to hold the nut 102 within the confines defined by the bracket portion 112 and the retainer 108. The retainer 108 is attached to the bracket portion 112 by squeezing the end portions 168, 176 together until side portions 170, 174 are close enough together to fit in the space between the sidewalls 118, 120 of the holding bracket 104. The retainer 108 is then placed between the sidewalls 118, 120 with the side portions 170, 174 being aligned with the slots 130, 132. The squeeze force on end portions 168, 176 is then released, allowing the side portions 170, 174 to move outwardly and into the slots 130, 132, into the position shown in FIG. 2. The middle portion 172 of the retainer 108 is positioned around the cylindrical portion 150 of the nut 102.

Thus, the nut 102, the holding bracket 104, the ball 106 and the retainer 108 are preferably preassembled together to form the nut plate 100 of the first embodiment of the invention prior to the nut plate 100 being used in operation.

Figure 7:
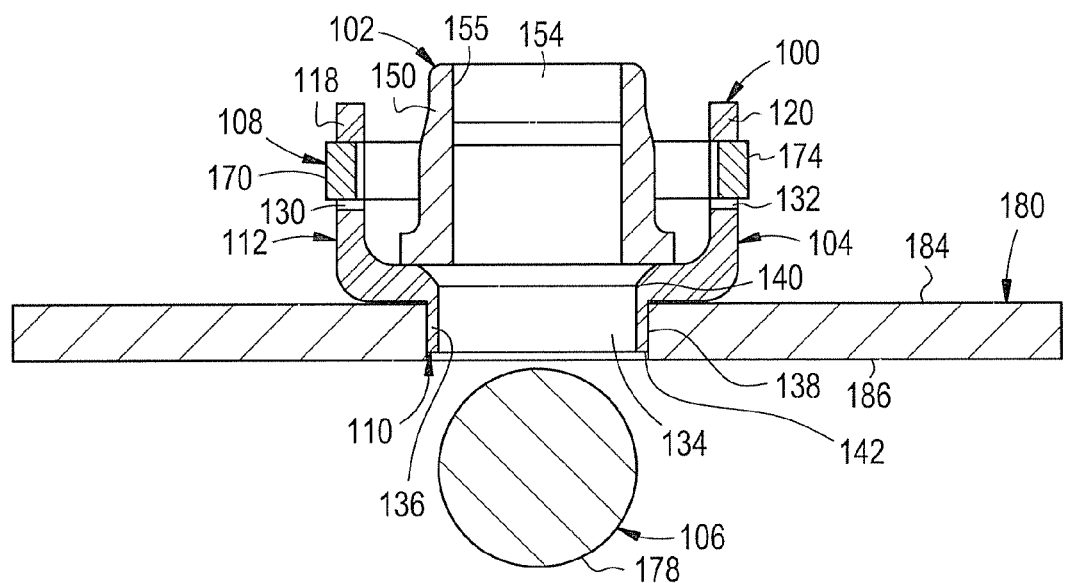
Figure 6:
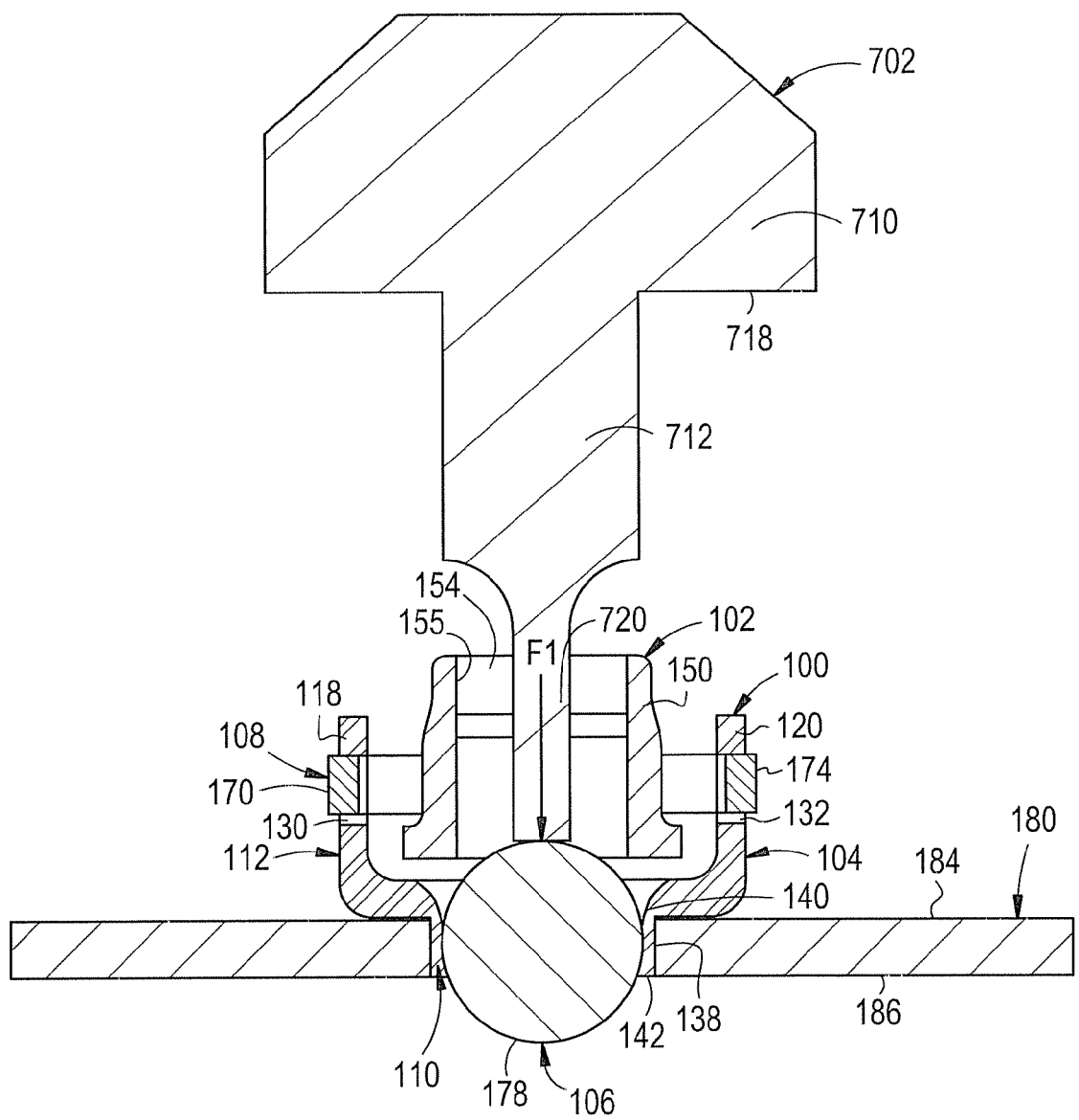

In operation, the nut plate 100 is secured to a workpiece 180 by inserting the tubular portion 110 of the holding bracket 104 into an aperture 182 of the workpiece 180, such that the undersurface 144 of the bracket portion 112 of the holding bracket 104 sits on a top surface 184 of the workpiece 180, as illustrated in FIGS. 5-7. The aperture 182 has a diameter which is slightly larger than a diameter of the tubular portion 110 of the holding bracket 104, which includes the lobes 146. The aperture 182 has a length which is preferably larger than or equal to a length of the tubular portion 110 of the holding bracket 104 such that the tubular portion 110 does not extend beyond a bottom surface 186 of the workpiece 180.

Once the nut plate 100 is properly positioned within the workpiece 180, a force F1 is applied to the ball 106 through the aperture 154 of the cylindrical portion 150 of the nut 102. The force F1 on the ball 106 seats the tubular portion 110 and the bracket portion 112 of the holding bracket 104 firmly against and within the workpiece 180.

Upon application of force F1 to the ball 106, the outer surface 178 of the ball 106 meets resistance from the shoulder 140 of the inner wall 136 such that the inner wall 136 is forced to expand radially outwardly until the inner wall 136 reaches a diameter which allows for the ball 106 to continue to move into and through the tubular portion 110 of the bracket portion 112 of the holding bracket 104. As the inner wall 136 of the tubular portion 110 is inwardly tapered or stepped from the shoulder 140 to the second end 142 of the tubular portion 110, the ball 106 will consistently have a diameter which is larger than the diameter of the inner wall 136 of the tubular portion 110. Thus, the axial force F1 applied to the ball 106 will place a continuous exertion of radial expansion on the inner wall 136 of the tubular portion 110. As the inner wall 136 is continuously expanded by the ball 106, the outer wall 138 of the tubular portion 110 continuously expands radially outwardly within the aperture 182 against the aperture wall 188 of the workpiece 180, thus embedding the lobes 146a, 146b in the aperture wall 188 of the workpiece 180 in a fixed and intimate engagement with the aperture wall 188.

The angled portions 148a of the lobes 146a embed further into the aperture wall 188 of the workpiece 180 in comparison to the remainder of the lobes 146a, to provide improved torque-out of the holding bracket 104. As the high lobes 146a embed into the aperture wall 188 of the workpiece 180, material of the workpiece 180 is displaced between high lobes 146a. The displaced material, however, does not always fill the space between the high lobes 146a and, therefore, the low lobes 146b are provided to both take up space and act as a seal with the aperture wall 188 of the workpiece 180.

The ball 106 will initially expand the tubular portion 110 as well as place a compressive load on the components to seat them against the top surface 184 of the workpiece 180. The tubular portion 110 will expand to engage the aperture wall 188 of the workpiece 180. As this occurs, radial forces are established, but they are not sufficient to deform the ball 106 radially. Thus, the ball 106 can handle tolerance variations in the aperture 182 of the workpiece 180, and will continuously deform the tubular portion 110 radially outward to engage the aperture wall 188 with sufficient force to cause the lobes 146, or alternate structure, on the outer wall 138 of the tubular portion 110 to embed in the aperture wall 188 of the workpiece 180. As can be appreciated, the increasing wall thickness of the tubular portion 110 insures that radial deformation continues along the entire length of tubular portion 110 to attain the desired degree of engagement of the lobes 146 in the aperture wall 188 such that improved torque-out, push-out and fatigue characteristics are achieved.

When the ball 106 is pushed or forced completely through the aperture 134 of the tubular portion 110, the inner wall 136 of the tubular portion 110 is no longer tapered, but rather is relatively straight such that it has a generally consistent diameter throughout the length of the aperture 134 from the point where the shoulder 140 was provided to the second end 142 of the tubular portion 110, the generally consistent diameter being in accordance with the diameter of the ball 106. Further, when the ball 106 is pushed or forced completely through the aperture 134 of the tubular portion 110, the holding bracket 104 is attached to the workpiece 180, as illustrated in FIG. 7. A workpiece, such as a bolt, can then be attached to the nut plate 100. The ball 106 may either be discarded or reused in another nut plate assembly, as the ball 106 does not deform during the process of securing the holding bracket 104 to the workpiece 180.

With the holding bracket 104 attached to the workpiece 180, the retainer 108 allows for the nut 102 to float in an up and down direction and the recesses 156, 158 on the nut 102 and the protrusions 122, 124 on the holding bracket 104 allow for the nut 102 to float in a sideways direction, in order to permit alignment and attachment of a workpiece, such as a bolt, with the nut 102.

Attention is now directed to the nut plate 300 of the second embodiment of the invention as illustrated in FIGS. 8-14. The nut plate 300 of the second embodiment includes a nut 302, a holding bracket 304, a member 306, and a retainer 308.

The holding bracket 304 is generally Y-shaped in side elevation and includes a tubular portion 310 and a bracket portion 312 which extends outwardly from the tubular portion 310 at a first end 314 thereof. The bracket portion 312 includes a base portion 316 and opposed upstanding side walls 318, 320. The base portion 316 has a pair of protrusions 322, 324 which protrude upwardly from the base portion 316. Protrusion 322 is provided proximate to edge 326 of the base portion 316 and protrusion 324 is provided proximate to edge 328 of the base portion 316. Slots 330, 332 extend through the side walls 318, 320 of the bracket portion 312.

The tubular portion 310 extends in the opposite direction from the base portion 316 of the bracket portion 312 than do the side walls 318, 320 and the protrusions 322, 324 of the bracket portion 312. The tubular portion 310 has an aperture 334 therethrough which defines an inner wall 336 of the tubular portion 310. The tubular portion 310 also has an outer wall 338. At the first end 314 of the tubular portion 310, the inner wall 336 defines a first inner diameter of the aperture 334. From the first end 314 of the tubular portion 310, the inner wall 336 curves inwardly to provide a shoulder 340 and to define a second inner diameter of the aperture 334 and thus a wall thickness of the tubular portion 310 between the outer wall 338 and the shoulder 340. The second inner diameter of the aperture 334 at the shoulder 340 of the tubular portion 310 is smaller than the first inner diameter of the aperture 334 at the first end 314 of the tubular portion 310. From the shoulder 340 to a second end 342 of the tubular portion 310, the inner wall 336 is tapered or stepped such that the inner wall 336 at the second end 342 of the tubular portion 310 defines a third inner diameter and thus a wall thickness of the tubular portion 310 at the second end 342 of the tubular portion 310. The wall thickness of the tubular portion 310 at the second end 342 of the tubular portion 310 is larger than the wall thickness of the tubular portion 310 between the outer wall 338 and the shoulder 340 of the tubular portion 310. The third inner diameter of the aperture 334 at the second end 342 of the tubular portion 310 is smaller than the second inner diameter of the aperture 334 at the shoulder 340 of the tubular portion 310.

Figure 8:
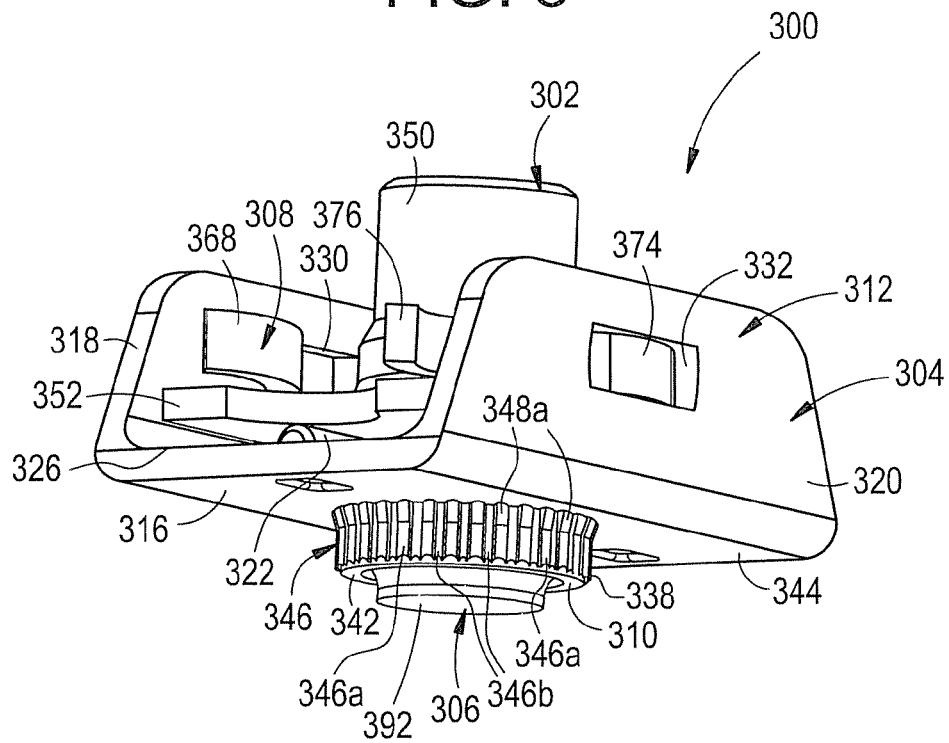
FIG. 8 is a perspective view of a nut plate of a second embodiment of the invention.
Figure 9:
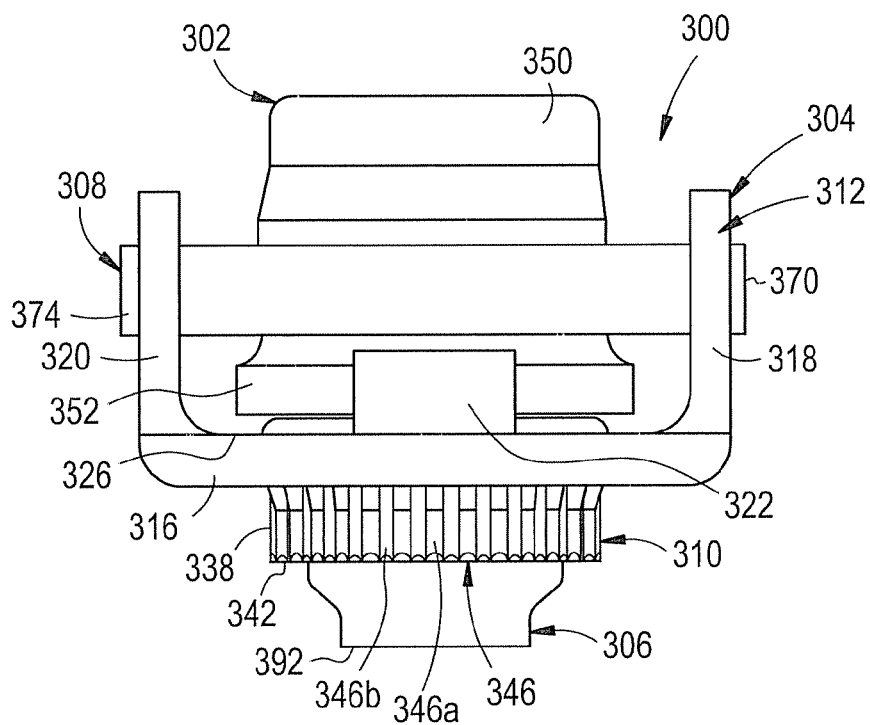
FIG. 9 is a side elevational view of the nut plate of the second embodiment of the invention.
Figure 10:
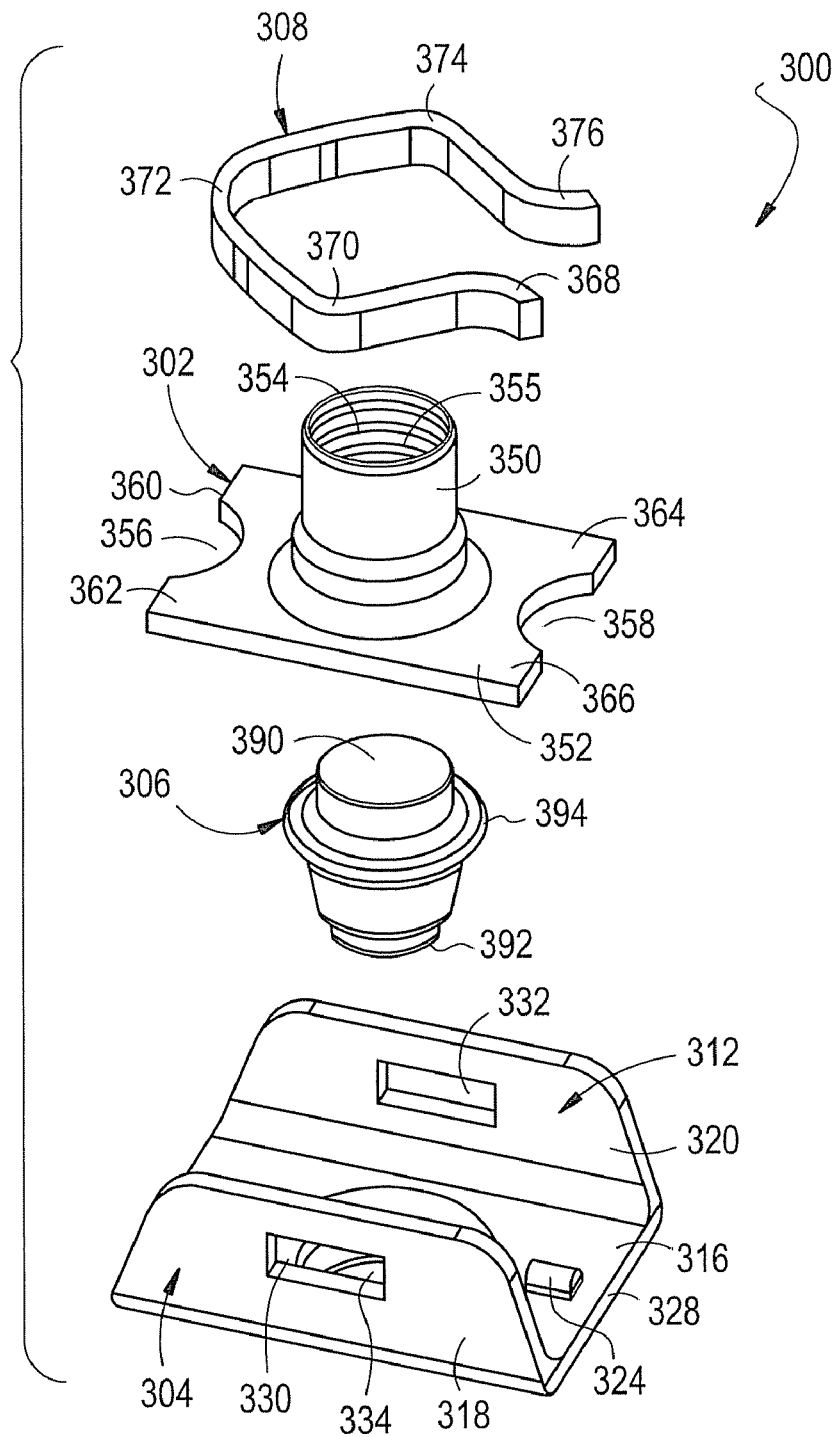
FIG. 10 is an exploded perspective view of the nut plate of the second embodiment of the invention.
Figure 11:
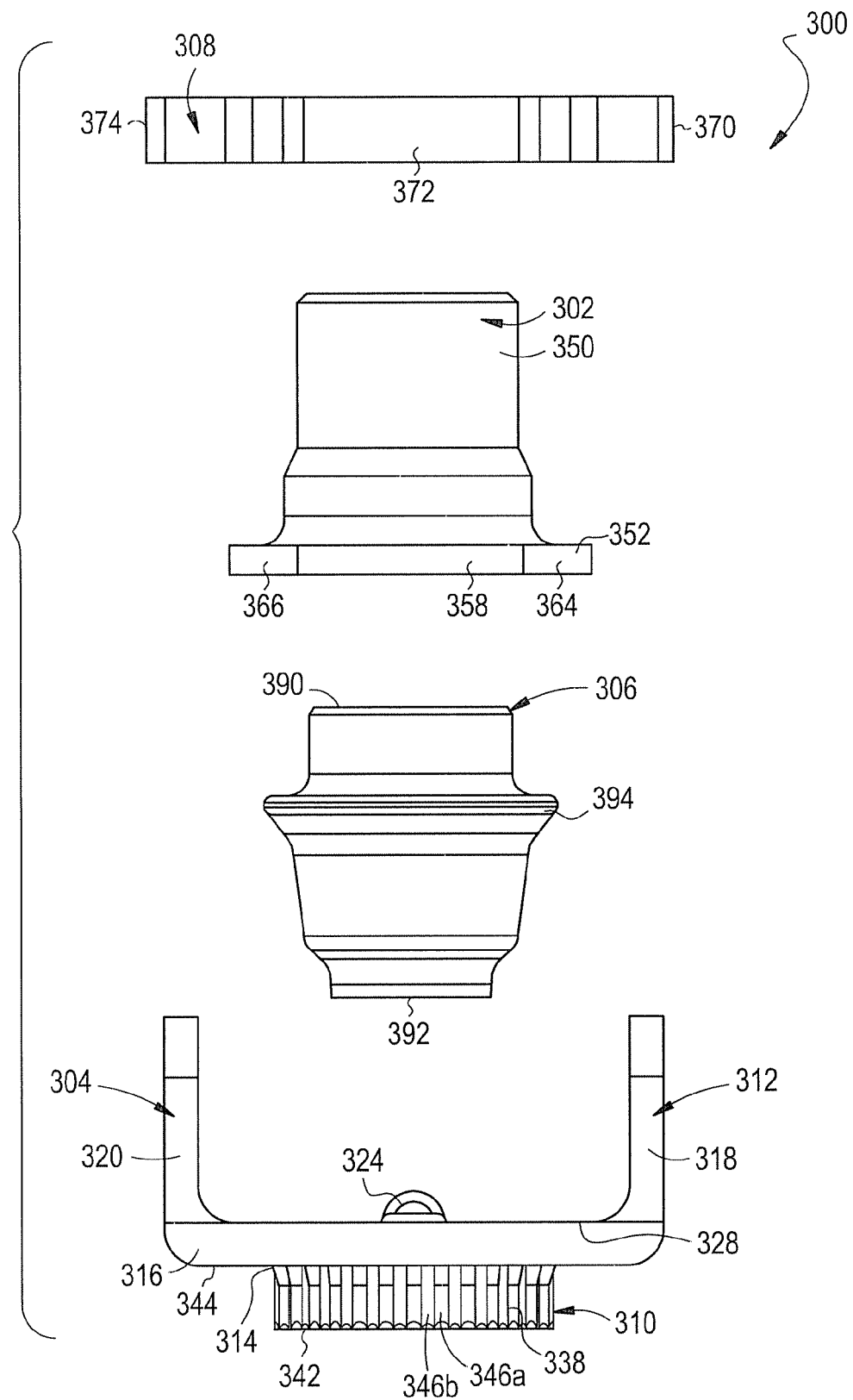
FIG. 11 is an exploded side elevational view of the nut plate of the second embodiment of the invention.

The outer wall 338 of the tubular portion 310 extends from an undersurface 344 of the bracket portion 312 to the second end 342 of the tubular portion 310. Lobes or ribs 346 extend outwardly from the outer wall 338 of the tubular portion 310. The lobes 346 can be formed in many different configurations on the outer wall 338, but, preferably, the lobes 346 are formed as best illustrated in FIGS. 8 and 9. The lobes 346 are axially straight along the outer wall 338 such that they extend from the second end 342 of the tubular portion 310 to the undersurface 344 of the bracket portion 312. Two different types of lobes 346 are provided along the outer wall 338, namely high lobes 346a and low lobes 346b. The high lobes 346a extend outwardly from the outer wall 338 a greater distance than the low lobes 346b. The high lobes 346a and the low lobes 346b are preferably alternated around the outer wall 338 such that each high lobe 346a is positioned between two low lobes 346b and each low lobe 346b is positioned between two high lobes 346a. Each of the high lobes 346a also preferably have an angled portion 348a proximate to the undersurface 344 of the bracket portion 312 such that the high lobes 346a extend outwardly further from the outer wall 338 proximate to the undersurface 344 of the bracket portion 312 than proximate to the second end 342 of the tubular portion 310. The purpose of the lobes 346a, 346b will be discussed in further detail herein.

The nut 302 includes a cylindrical portion 350 and a flat base portion 352 which extends outwardly from the cylindrical portion 350 at one end thereof. The cylindrical portion 350 has an aperture 354 therethrough which defines an inner wall 355 of the cylindrical portion 350. The cylindrical portion 350 at the inner diameter is generally threaded such that a workpiece, such as a bolt, can be attached thereto. The flat base portion 352 includes end recesses 356, 358 and axially projecting end portions 360, 362 and 364, 366 situated on opposite sides of the recesses 356, 358, respectively. The recesses 356, 358 are sized to accept the protrusions 322, 324 of the holding bracket 304.

The retainer 308 may be a spring formed from rectangular wire bent into the form illustrated. Retainer 308 is preferably one piece and extends from end portion 368 to side portion 370, then to middle portion 372, then to side portion 374, and then to end portion 376. The operation and purpose of the retainer 308 will be discussed further herein.

The mandrel 306 is preferably in the form of a mandrel which has a first end 390 and a second end 392. Between the first and second ends 390, 392, the mandrel 306 has an enlarged portion 394. The enlarged portion 394 is provided more proximate to the first end 390 than to the second end 392. The enlarged portion 394 has a diameter which is smaller than the first inner diameter of the tubular portion 310 but larger than the second inner diameter of the tubular portion 310. The first and second ends 390, 392 have diameters which are less than the diameter of the enlarged portion 394 and which are smaller than the diameters of the aperture 354 of the cylindrical portion 350 of the nut 302 and of the aperture 334 of the tubular portion 310. The mandrel 306 is generally tapered or stepped from the enlarged portion 394 to the second end 392 thereof.

In order to assemble the nut plate 300, the second end 392 of the mandrel 306 is inserted into the aperture 334 of the tubular portion 310 of the holding bracket 304 at the first end 314 thereof until the enlarged portion 394 of the mandrel 306 meets resistance from the shoulder 340 of the inner wall 336 of the tubular portion 310.

The nut 302 is then connected to the holding bracket 304 by positioning the aperture 354 of the cylindrical portion 350 of the nut 302 over the first end 390 of the mandrel 306 and lowering the nut 302 until the nut 302 rests on the enlarged portion 394 of the mandrel 306, such that the first end 390 of the mandrel 306 is positioned within the aperture 354 of the cylindrical portion 350 of the nut 302, between the inner wall 355 of the nut 302. The nut 302 is also positioned such that the protrusions 322, 324 on the base portion 316 are positioned within/or below the recesses 356, 358 of the nut 302.

The retainer 308 is then attached to the bracket portion 312 to hold the nut 302 within the confines defined by the bracket portion 312 and the retainer 308. The retainer 308 is attached to the bracket portion 312 by squeezing the end portions 368, 376 together until side portions 370, 374 are close enough together to fit in the space between the sidewalls 318, 320 of the holding bracket 304. The retainer 308 is then placed between the sidewalls 318, 320 with the side portions 370, 374 being aligned with the slots 330, 332. The squeeze force on end portions 368, 376 is then released, allowing the side portions 370, 374 to move outwardly and into the slots 330, 332, into the position shown in FIGS. 8-9 and 12-14. The middle portion 372 of the retainer 308 is positioned around the cylindrical portion 350 of the nut 302.

Thus, the nut 302, the holding bracket 304, the mandrel 306 and the retainer 308 are preferably preassembled together to form the nut plate 300 of the second embodiment of the invention prior to the nut plate 300 being used in operation.

Figure 12:
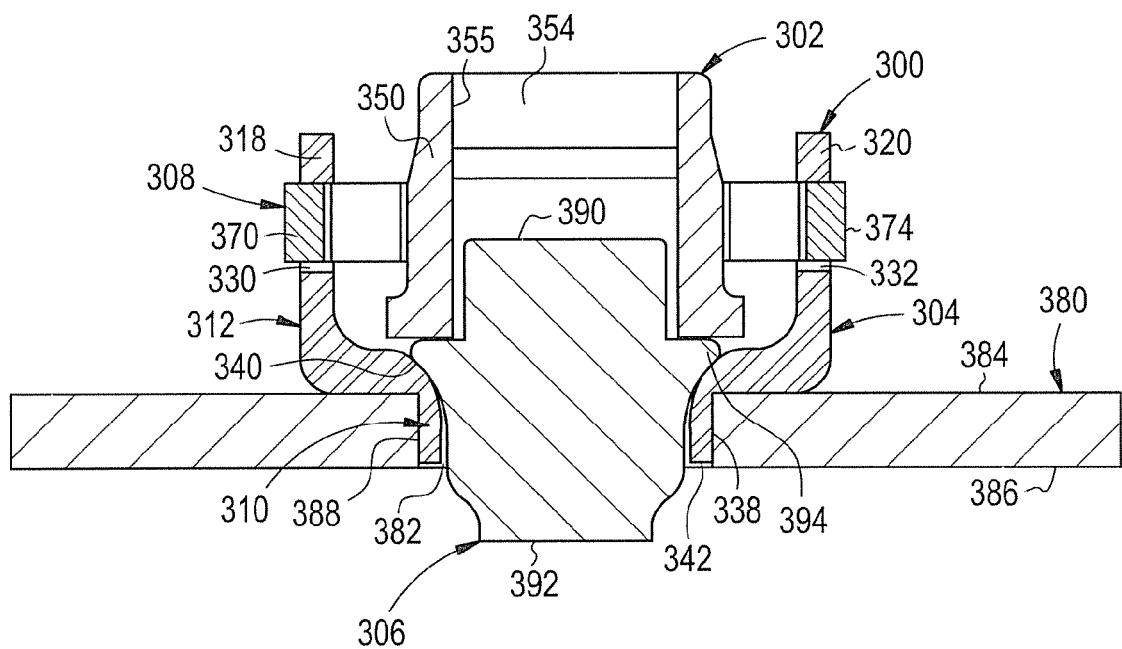
FIGS. 12-14 are side elevational cross-sectional views of the nut plate of the second embodiment of the invention being attached to the workpiece.
Figure 13:
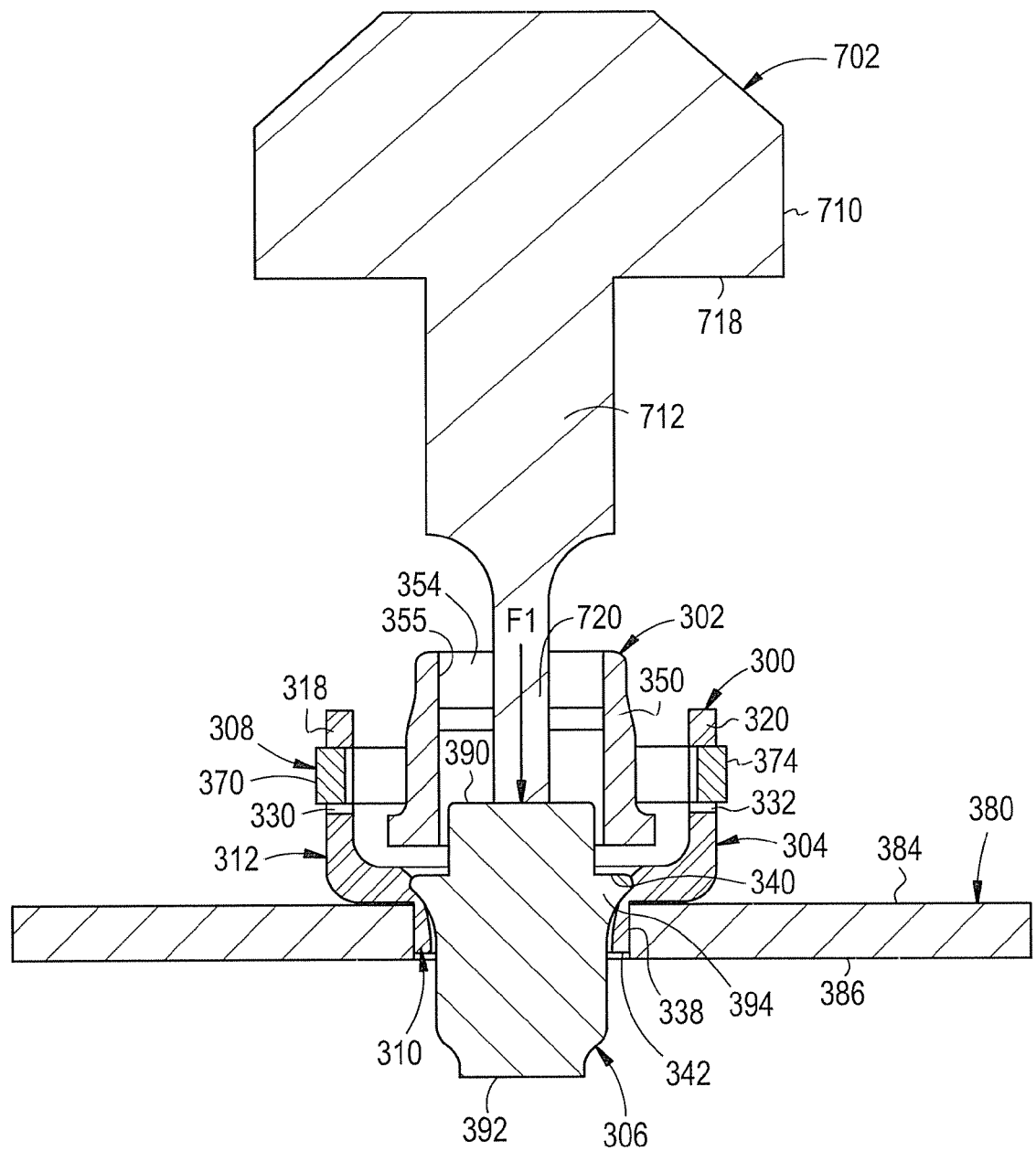
Figure 14:
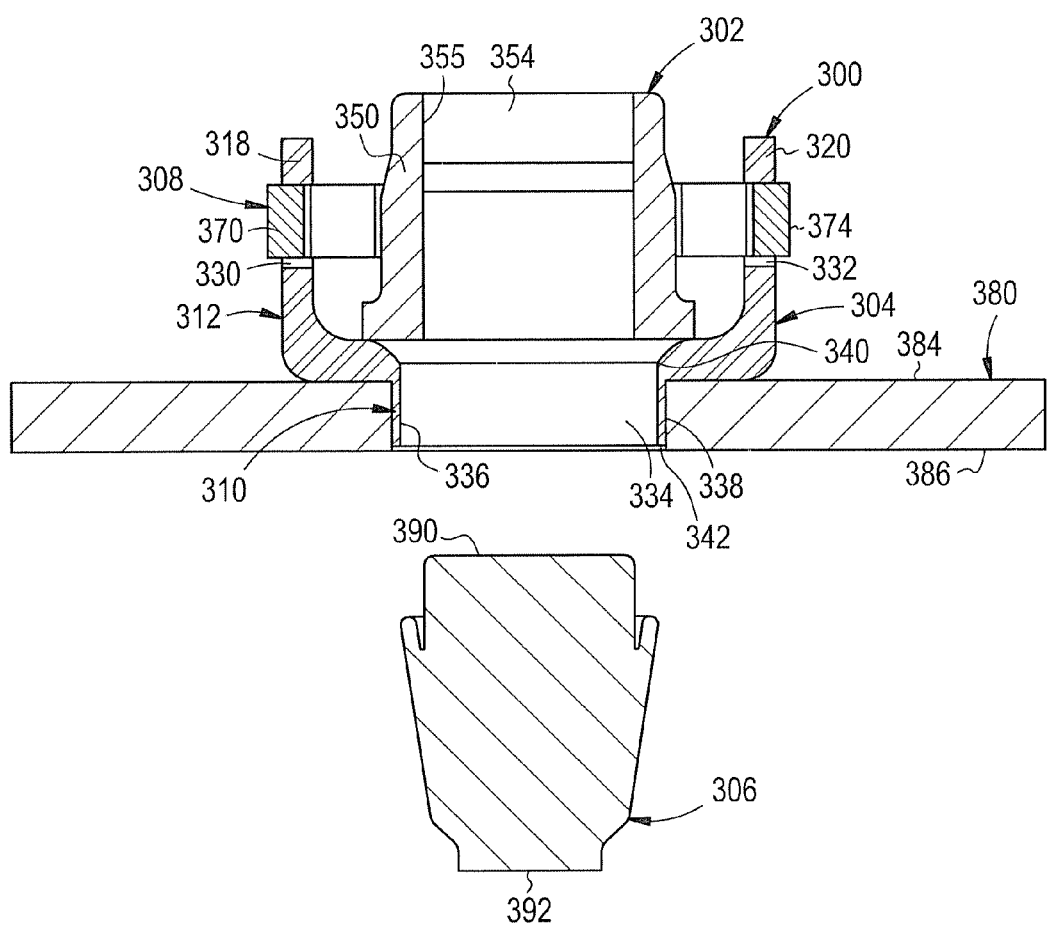

In operation, the nut plate 300 is secured to a workpiece 380 by inserting the tubular portion 310 of the holding bracket 304 into an aperture 382 of the workpiece 380, such that the undersurface 344 of the bracket portion 312 of the holding bracket 304 sits on a top surface 384 of the workpiece 380, as illustrated in FIGS. 12-14. The aperture 382 has a diameter which is slightly larger than a diameter of the tubular portion 310 of the holding bracket 304, which includes the lobes 346. The aperture 382 has a length which is preferably larger than or equal to a length of the tubular portion 310 of the holding bracket 304 such that the tubular portion 310 does not extend beyond a bottom surface 386 of the workpiece 380.

Once the nut plate 300 is properly positioned within the workpiece 380, a force F1 is applied to the first end 390 of the mandrel 306 through the aperture 354 of the cylindrical portion 350 of the nut 302. The force F1 on the mandrel 306 seats the tubular portion 310 and the bracket portion 312 of the holding bracket 304 firmly against and within the workpiece 380.

Upon application of force F1 to the mandrel 306, the enlarged portion 394 of the mandrel 306 meets resistance from the shoulder 340 of the inner wall 336 such that the inner wall 336 is forced to expand radially outwardly as the enlarged portion 394 deforms to the size of the expanded inner wall 330, until the inner wall 336 reaches a diameter which allows for the mandrel 306 to continue to move into and through the tubular portion 310 of the bracket portion 312 of the holding bracket 304. As the inner wall 336 of the tubular portion 310 is inwardly tapered or stepped from the shoulder 340 to the second end 342 of the tubular portion 310, the enlarged portion 394 will consistently have an outer diameter which is larger than the diameter of the inner wall 336 of the tubular portion 310, even though the enlarged portion 394 deforms to assume the geometry relevant to the size of the expanded inner wall 336 of the tubular portion 310. Thus, the axial force F1 applied to the mandrel 306 will place a continuous exertion of radial expansion on the inner wall 336 of the tubular portion 310. As the inner wall 336 is continuously expanded by the mandrel 306, the outer wall 338 of the tubular portion 310 continuously expands radially outwardly within the aperture 382 against the aperture wall 388 of the workpiece, thus embedding the lobes 346a, 346b in the aperture wall 388 of the workpiece 380 in a fixed and intimate engagement with the aperture wall 388.

The angled portions 348a of the lobes 346a embed further into the aperture wall 388 of the workpiece 380 in comparison to the remainder of the lobes 346a, to provide improved torque-out of the holding bracket 304. As the high lobes 346a embed into the aperture wall 388 of the workpiece 380, material of the workpiece 380 is displaced between high lobes 346a. The displaced material, however, does not always fill the space between the high lobes 346a and, therefore, the low lobes 346b are provided to both take up space and act as a seal with the aperture wall 388 of the workpiece 380.

The enlarged portion 394 of the mandrel 306 will initially expand the tubular portion 310 as well as place a compressive load on the components to seat them against the top surface 384 of the workpiece 380. The tubular portion 310 will expand to engage the aperture wall 388 of the workpiece 380. As this occurs, radial forces are established which are sufficient to deform the enlarged portion 394 radially. Thus, the mandrel 306 can handle tolerance variations in the aperture 382 of the workpiece 380, and will continuously deform the tubular portion 310 radially outward to engage the aperture wall 388 with sufficient force to cause the lobes 346, or alternate structure, on the outer wall 338 of the tubular portion 310 to embed in the aperture wall 388 of the workpiece 380. As can be appreciated, the increasing wall thickness of the tubular portion 310 insures that radial deformation continues along the entire length of the tubular portion 310 to attain the desired degree of engagement of the lobes 346 in the aperture wall 388 such that improved torque-out, push-out and fatigue characteristics are achieved.

When the mandrel 306 is pushed or forced completely through the aperture 334 of the tubular portion 310, the inner wall 336 of the tubular portion 310 is no longer tapered, but rather is relatively straight such that it has a generally consistent diameter throughout the length of the aperture 334 from the point where the shoulder 340 was provided to the second end 342 of the tubular portion 310. Further, when the mandrel 306 is pushed or forced completely through the aperture 334 of the tubular portion 310, the holding bracket 304 is attached to the workpiece 380, as illustrated in FIG. 14. The mandrel 306, as it is deformed during the process of securing the holding bracket 304 to the workpiece 380, should be discarded.

With the holding bracket 304 attached to the workpiece 380, the retainer 308 allows for the nut 302 to float in an up and down direction and the recesses 356, 358 on the nut 302 and the protrusions 322, 324 on the holding bracket 304 allow for the nut 302 to float in a sideways direction, in order to permit alignment and attachment of a workpiece, such as a bolt, with the nut 302.

Attention is now directed to the nut plate 500 of the third embodiment of the invention as illustrated in FIGS. 15-21.

The nut plate 500 of the third embodiment includes a nut 502, a holding bracket 504, a member 506, and a retainer 508.

The holding bracket 504 is generally Y-shaped in side elevation and includes a tubular portion 510 and a bracket portion 512 which extends outwardly from the tubular portion 510 at a first end 514 thereof. The bracket portion 512 includes a base portion 516 and opposed upstanding side walls 518, 520. The base portion 516 has a pair of protrusions 522, 524 which protrude upwardly from the base portion 516. Protrusion 522 is provided proximate to edge 526 of the base portion 516 and protrusion 524 is provided proximate to edge 528 of the base portion 516. Slots 530, 532 extend through the side walls 518, 520 of the bracket portion 512.

The tubular portion 510 extends in the opposite direction from the base portion 516 of the bracket portion 512 than do the side walls 518, 520 and the protrusions 522, 524 of the bracket portion 512. The tubular portion 510 has an aperture 534 therethrough which defines an inner wall 536 of the tubular portion 510. The tubular portion 510 also has an outer wall 538. At the first end 514 of the tubular portion 510, the inner wall 536 defines a first inner diameter of the aperture 534. From the first end 514 of the tubular portion 510, the inner wall 536 curves inwardly to provide a shoulder 540 and to define a second inner diameter of the aperture 534 and thus a wall thickness of the tubular portion 510 between the outer wall 538 and the shoulder 540. The second inner diameter of the aperture 534 at the shoulder 540 of the tubular portion 510 is smaller than the first inner diameter of the aperture 534 at the first end 514 of the tubular portion 510. From the shoulder 540 to a second end 542 of the tubular portion 510, the inner wall 536 is tapered or stepped such that the inner wall 536 at the second end 542 of the tubular portion 510 defines a third inner diameter and thus a wall thickness of the tubular portion 510 at the second end 542 of the tubular portion 510. The wall thickness of the tubular portion 510 at the second end 542 of the tubular portion 510 is larger than the wall thickness of the tubular portion 510 between the outer wall 538 and the shoulder 540 of the tubular portion 510. The third inner diameter of the aperture 534 at the second end 542 of the tubular portion 510 is smaller than the second inner diameter of the aperture 534 at the shoulder 540 of the tubular portion 510.

Figure 15:
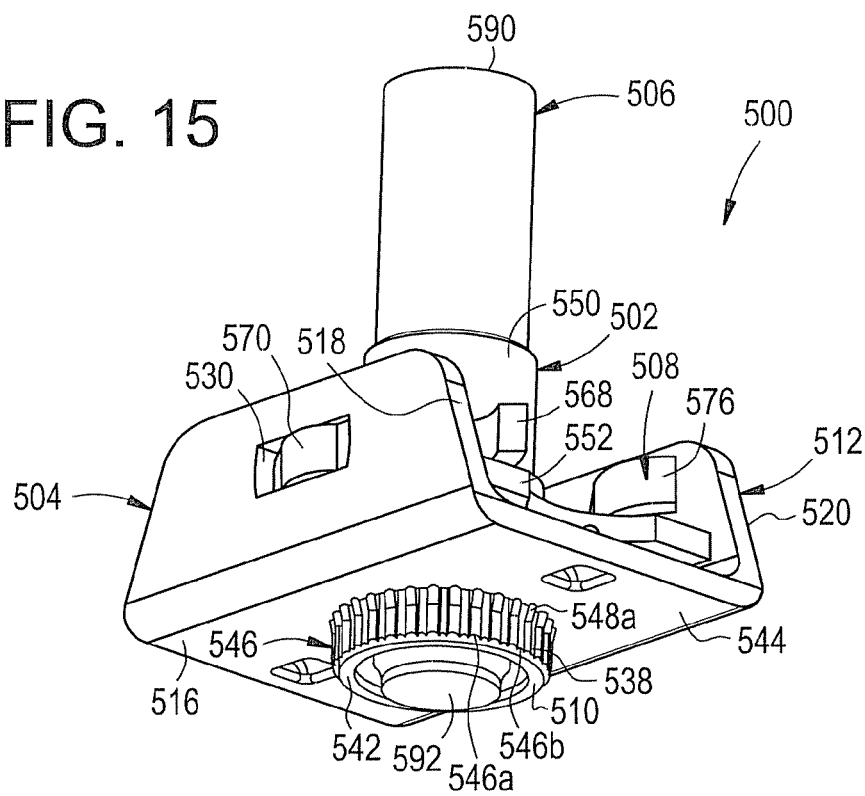
FIG. 15 is a perspective view of a nut plate of a third embodiment of the invention.
Figure 16:
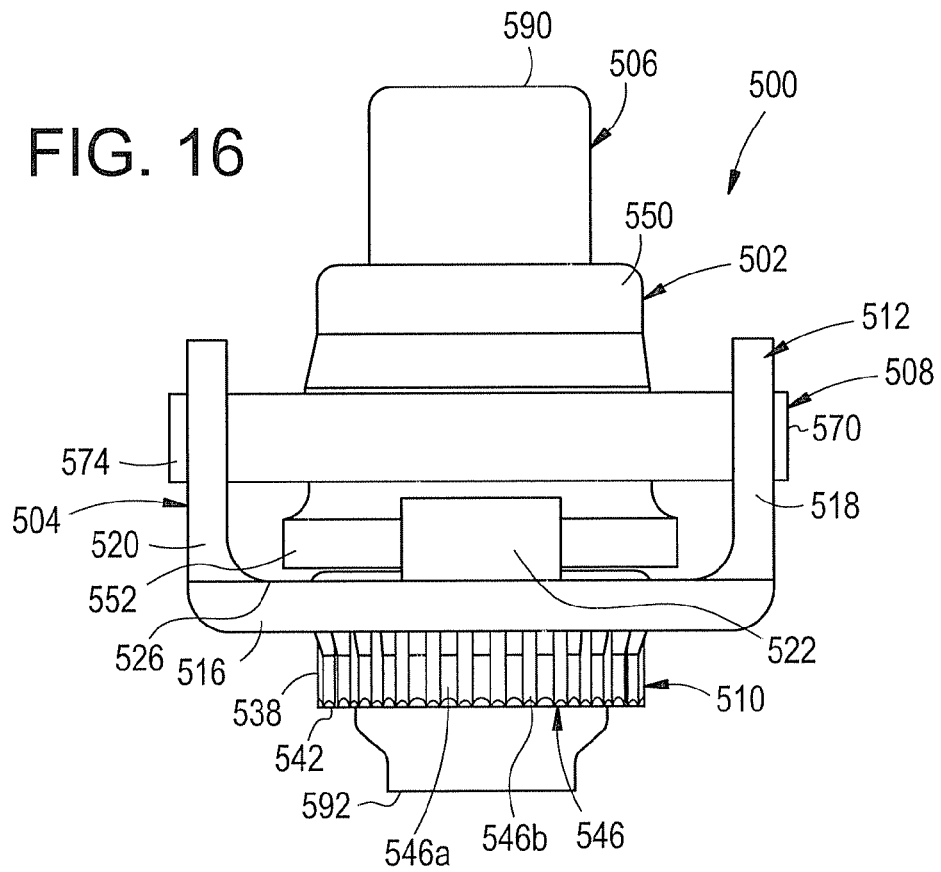
FIG. 16 is a side elevational view of the nut plate of the third embodiment of the invention.
Figure 17:
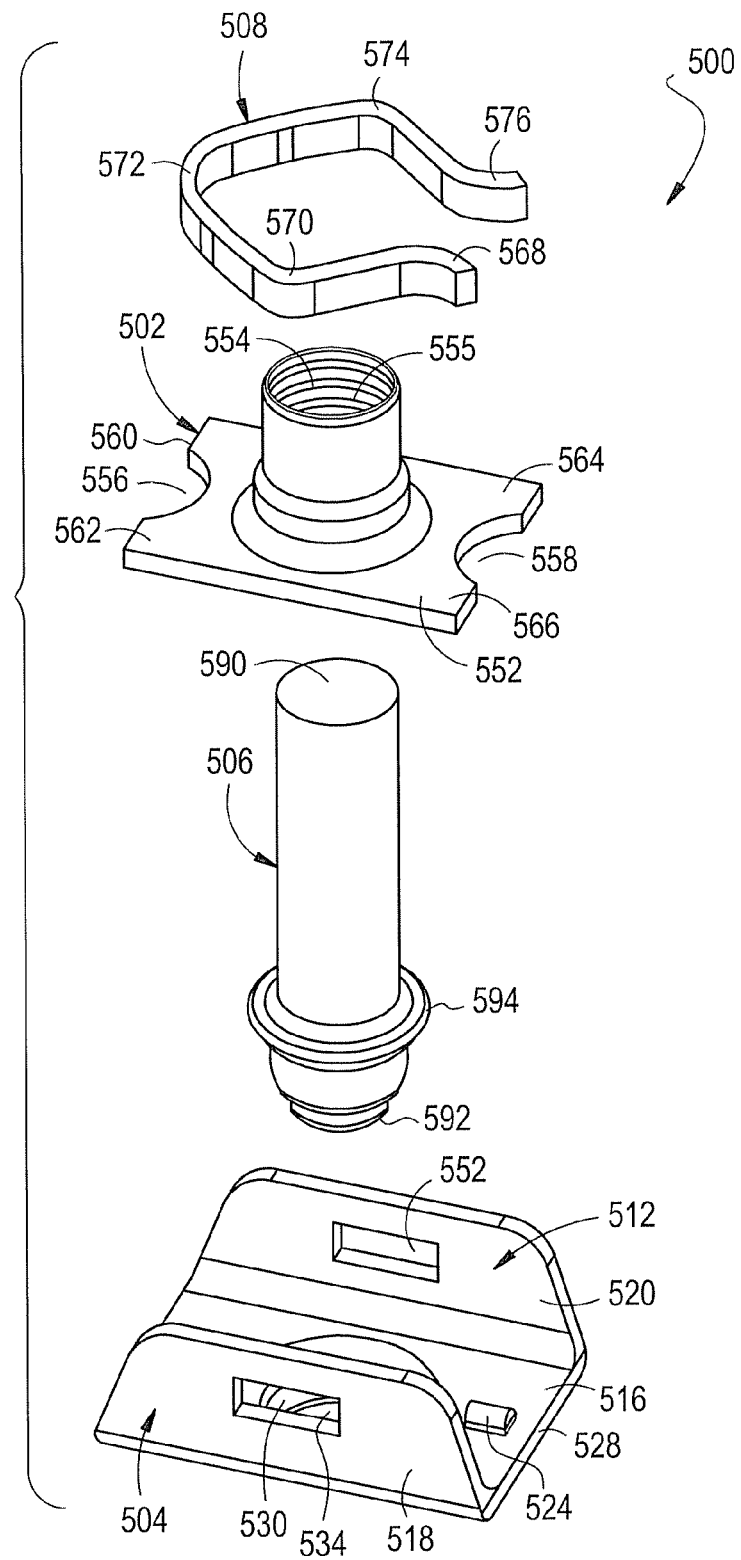
FIG. 17 is an exploded perspective view of the nut plate of the third embodiment of the invention.
Figure 18:
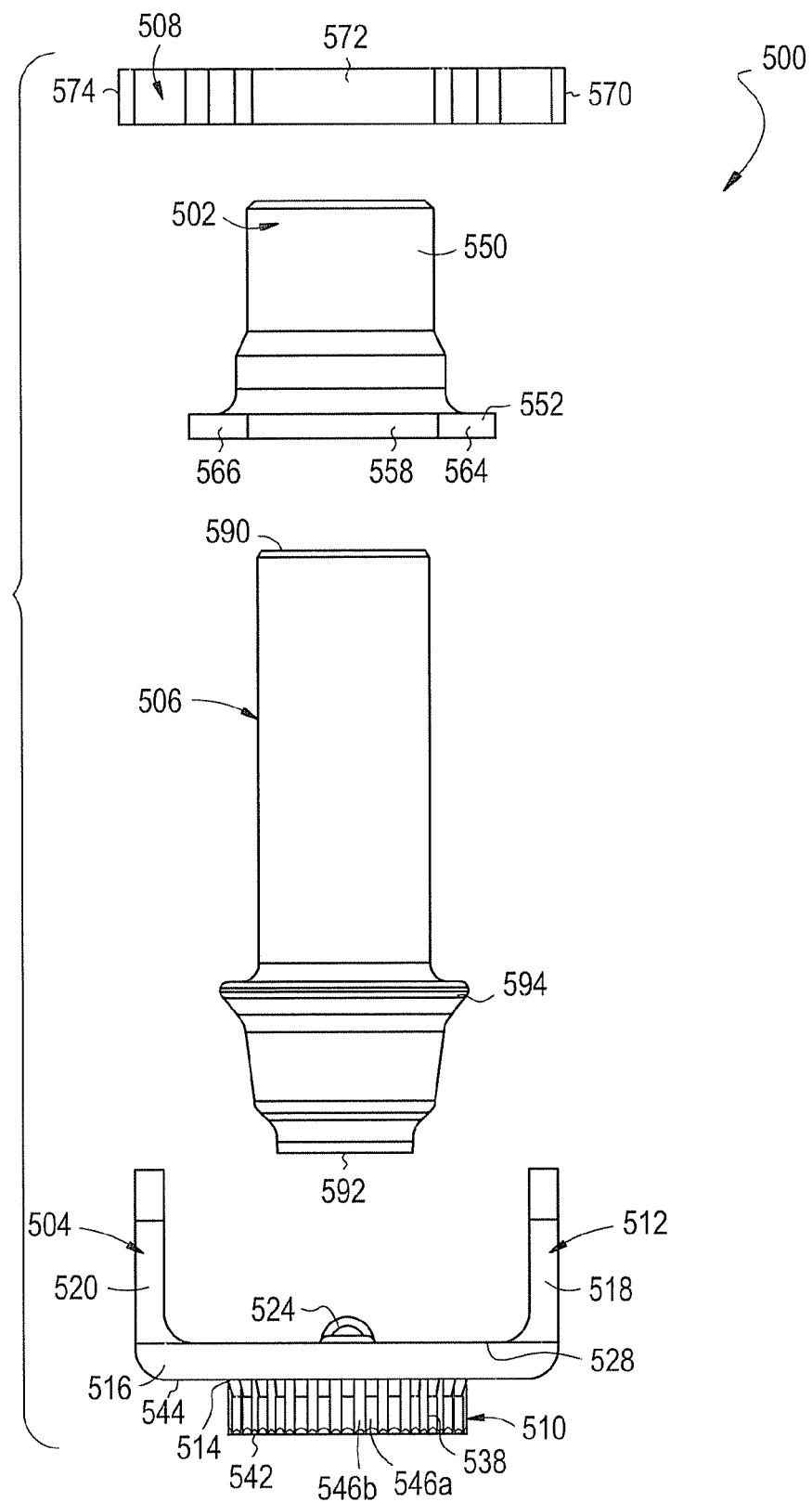
FIG. 18 is an exploded side elevational view of the nut plate of the third embodiment of the invention.

The outer wall 538 of the tubular portion 510 extends from an undersurface 544 of the bracket portion 512 to the second end 542 of the tubular portion 510. Lobes or ribs 546 extend outwardly from the outer wall 538 of the tubular portion 510. The lobes 546 can be formed in many different configurations on the outer wall 538, but, preferably, the lobes 546 are formed as best illustrated in FIGS. 15 and 16. The lobes 546 are axially straight along the outer wall 538 such that they extend from the second end 542 of the tubular portion 510 to the undersurface 544 of the bracket portion 512. Two different types of lobes 546 are provided along the outer wall 538, namely high lobes 546a and low lobes 546b. The high lobes 546a extend outwardly from the outer wall 538 a greater distance than the low lobes 546b. The high lobes 546a and the low lobes 546b are preferably alternated around the outer wall 538 such that each high lobe 546a is positioned between two low lobes 546b and each low lobe 546b is positioned between two high lobes 546a. Each of the high lobes 546a also preferably have an angled portion 548a proximate to the undersurface 544 of the bracket portion 512 such that the high lobes 546a extend outwardly further from the outer wall 538 proximate to the undersurface 544 of the bracket portion 512 than proximate to the second end 542 of the tubular portion 510. The purpose of the lobes 546a, 546b will be discussed in further detail herein.

The nut 502 includes a cylindrical portion 550 and a flat base portion 552 which extends outwardly from the cylindrical portion 550 at one end thereof. The cylindrical portion 550 has an aperture 554 therethrough which defines an inner wall 555 of the cylindrical portion 550. The cylindrical portion 550 at the inner diameter is generally threaded such that a workpiece, such as a bolt, can be attached thereto. The flat base portion 552 includes end recesses 556, 558 and axially projecting end portions 560, 562 and 564, 566 situated on opposite sides of the recesses 556, 558, respectively. The recesses 556, 558 are sized to accept the protrusions 522, 524 of the holding bracket 504.

The retainer 508 may be a spring formed from rectangular wire bent into the form illustrated. Retainer 508 is preferably one piece and extends from end portion 568 to side portion 570, then to middle portion 572, then to side portion 574, and then to end portion 576. The operation and purpose of the retainer 508 will be discussed further herein.

The member 506 is preferably in the form of a mandrel which has a first end 590 and a second end 592. Between the first and second ends 590, 592, the mandrel 506 has an enlarged portion 594. The enlarged portion 594 is provided more proximate to the second end 592 than to the first end 590. The enlarged portion 594 has a diameter which is smaller than the first inner diameter of the tubular portion 510 but larger than the second inner diameter of the tubular portion 510. The first and second ends 590, 592 have diameters which are less than the diameter of the enlarged portion 594 and which are smaller than the diameters of the aperture 554 of the cylindrical portion 550 of the nut 502 and of the aperture 534 of the tubular portion 510. The mandrel 506 is generally tapered or stepped from the enlarged portion 594 to the second end 592 thereof.

In order to assemble the nut plate 500, the second end 592 of the mandrel 506 is inserted into the aperture 534 of the tubular portion 510 of the holding bracket 504 at the first end 514 thereof until the enlarged portion 594 of the mandrel 506 meets resistance from the shoulder 540 of the inner wall 536 of the tubular portion 510.

The nut 502 is then connected to the holding bracket 504 by positioning the aperture 554 of the cylindrical portion 550 of the nut 502 over the first end 590 of the mandrel 506 and lowering the nut 502 until the nut 502 rests on the enlarged portion 594 of the mandrel 506, such that the first end 590 of the mandrel 506 is positioned outside of and above the aperture 554 of the cylindrical portion 550 of the nut 502, between the inner wall 555 of the nut 502. The nut 502 is also positioned such that the protrusions 522, 524 on the base portion 516 are positioned within/or below the recesses 556, 558 of the nut 502.

The retainer 508 is then attached to the bracket portion 512 to hold the nut 502 within the confines defined by the bracket portion 512 and the retainer 508. The retainer 508 is attached to the bracket portion 512 by squeezing the end portions 568, 576 together until side portions 570, 574 are close enough together to fit in the space between the sidewalls 518, 520 of the holding bracket 504. The retainer 508 is then placed between the sidewalls 518, 520 with the side portions 570, 574 being aligned with the slots 530, 532. The squeeze force on end portions 568, 576 is then released, allowing the side portions 570, 574 to move outwardly and into the slots 530, 532, into the position shown in FIGS. 15-16 and 19-21. The middle portion 572 of the retainer 508 is positioned around the cylindrical portion 550 of the nut 502.

Thus, the nut 502, the holding bracket 504, the mandrel 506 and the retainer 508 are preferably preassembled together to form the nut plate 500 of the second embodiment of the invention prior to the nut plate 500 being used in operation.

Figure 19:
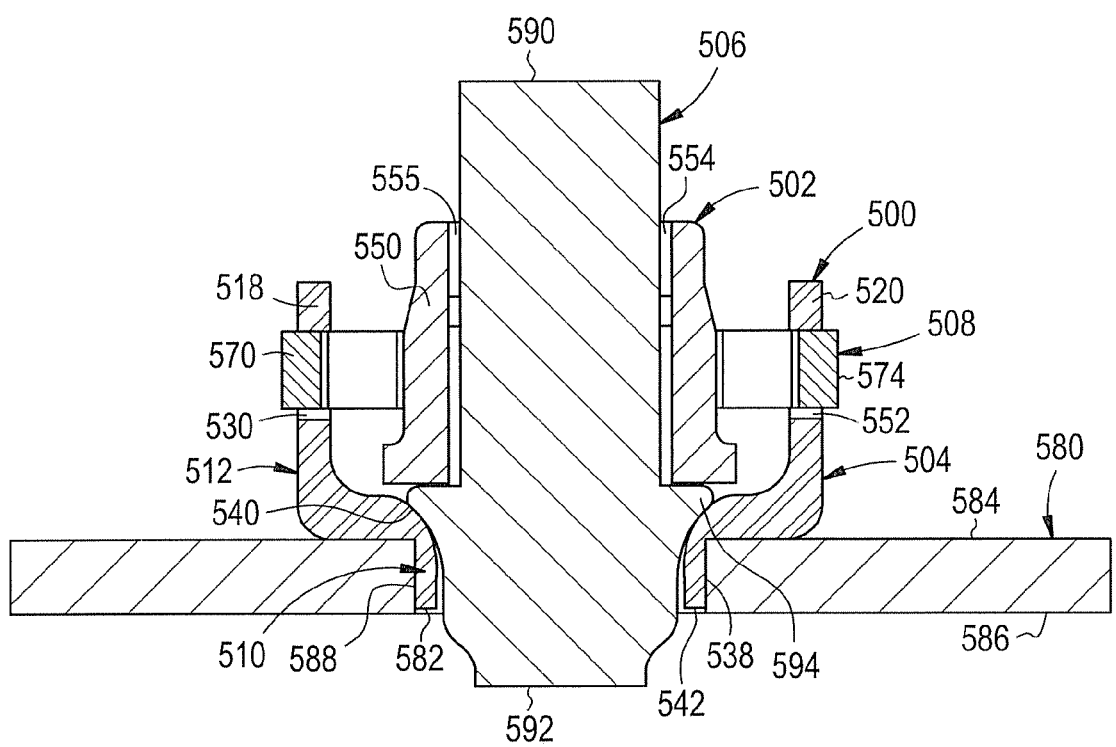
FIGS. 19-21 are side elevational cross-sectional views of the nut plate of the third embodiment of the invention being attached to the workpiece.
Figure 20:
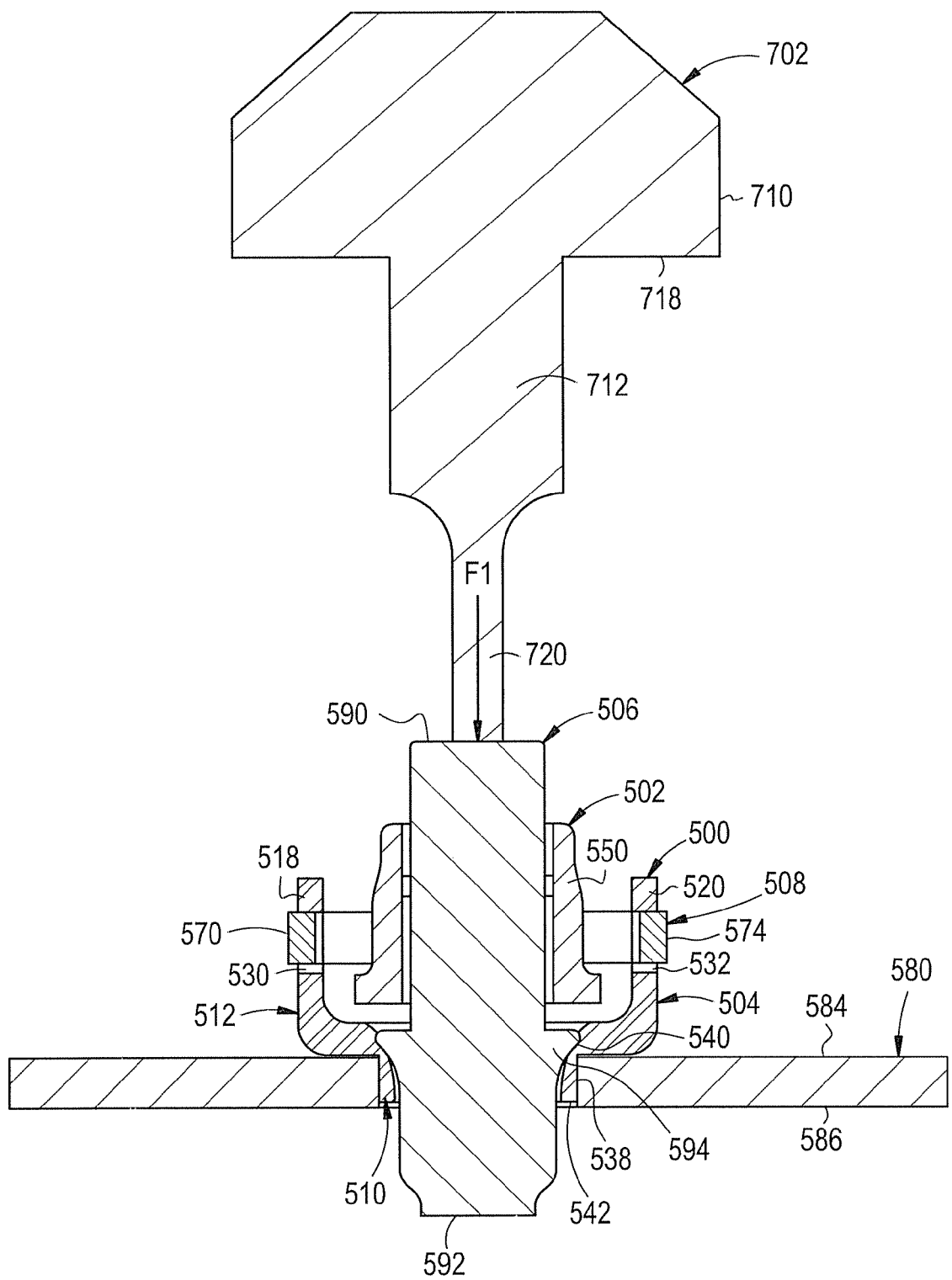
Figure 21:
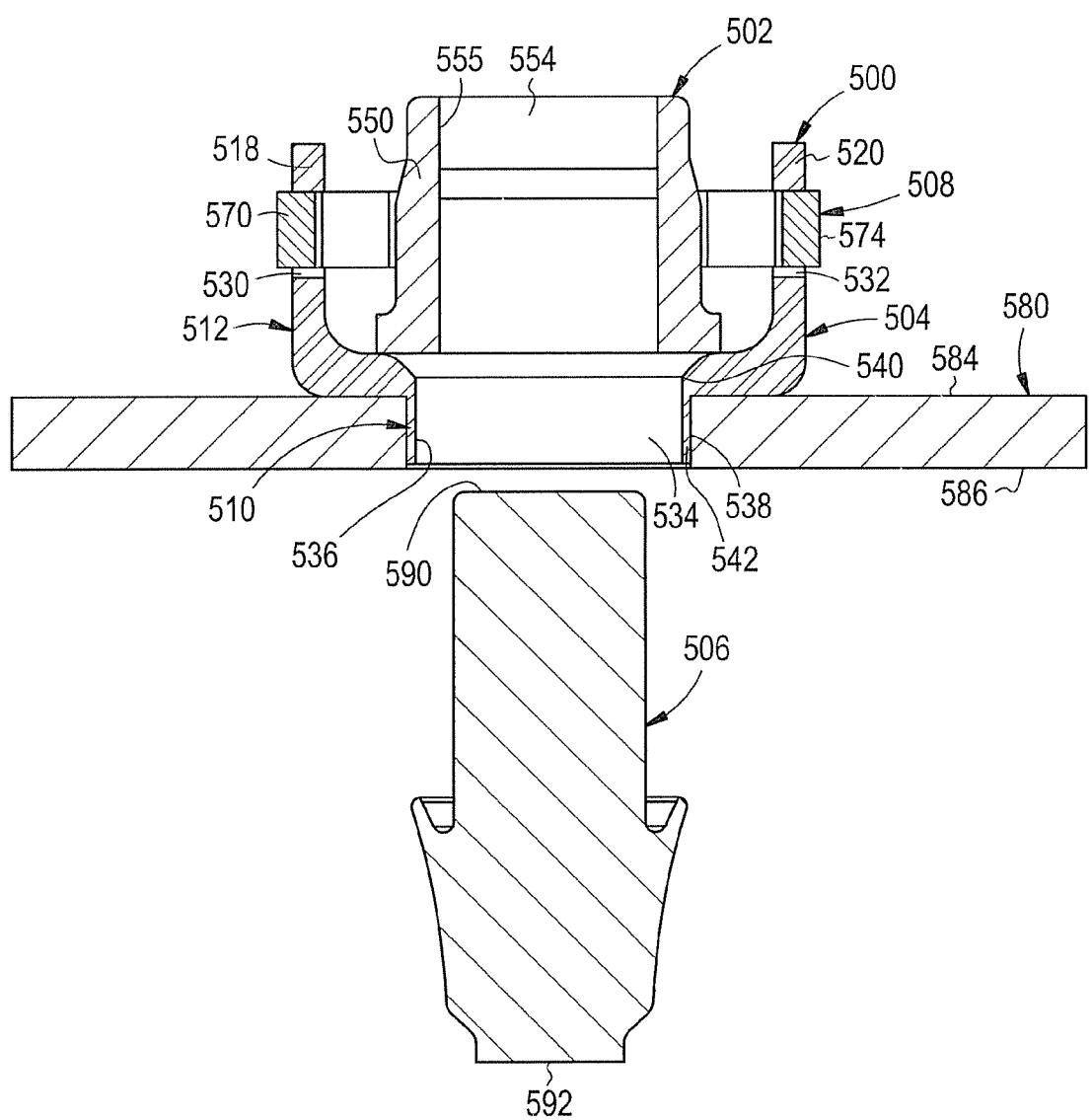
Figure 22:
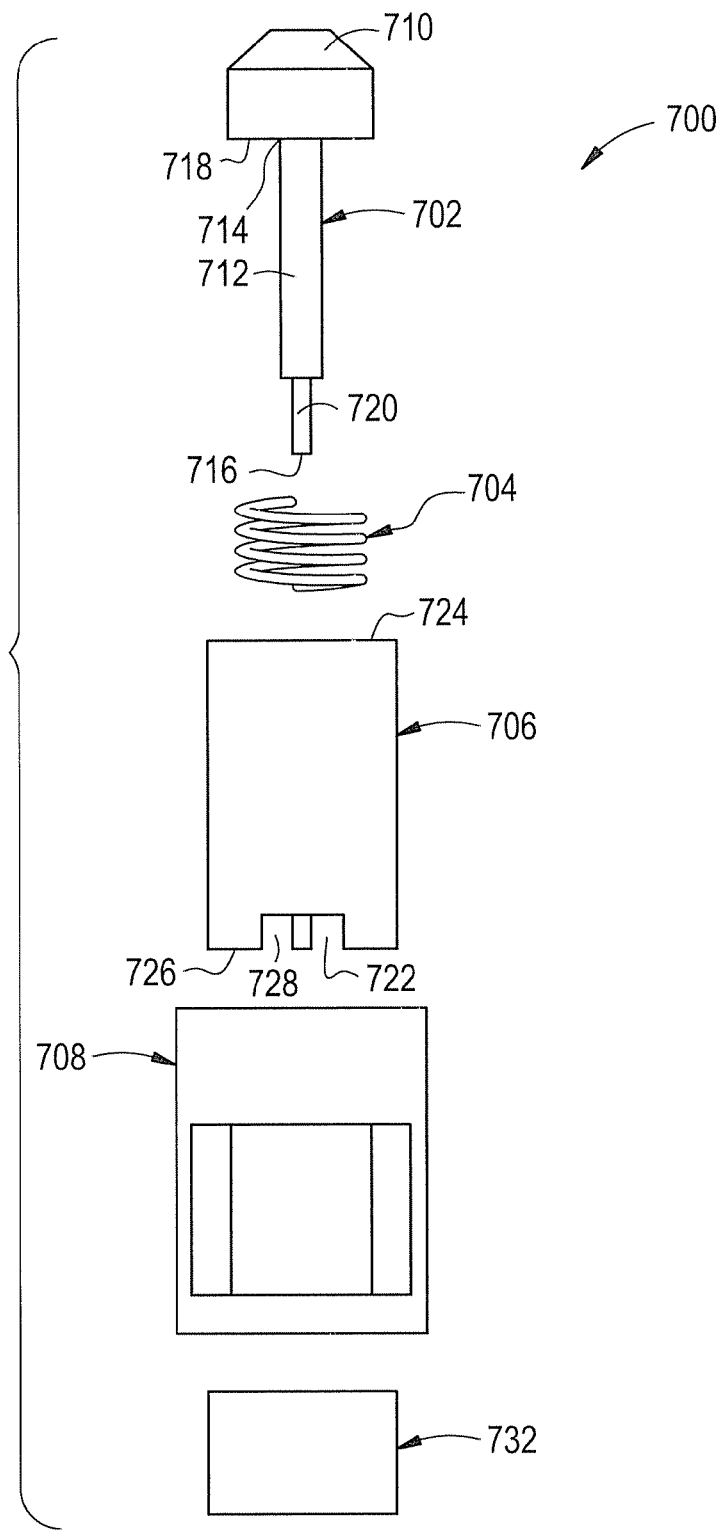
FIG. 22 is an exploded perspective view of the tool of the invention used for installing the nut plates of the different embodiments of the invention.

In operation, the nut plate 500 is secured to a workpiece 580 by inserting the tubular portion 510 of the holding bracket 504 into an aperture 582 of the workpiece 580, such that the undersurface 544 of the bracket portion 512 of the holding bracket 504 sits on a top surface 584 of the workpiece 580, as illustrated in FIGS. 19-21. The aperture 582 has a diameter which is slightly larger than a diameter of the tubular portion 510 of the holding bracket 504, which includes the lobes 546. The aperture 582 has a length which is preferably larger than or equal to a length of the tubular portion 510 of the holding bracket 504 such that the tubular portion 510 does not extend beyond a bottom surface 586 of the workpiece 580.

Once the nit plate 500 is properly positioned within the workpiece 580, a force F1 is applied to the first end 590 of the mandrel 506 through the aperture 554 of the cylindrical portion 550 of the nut 502. The force F1 on the mandrel 506 seats the tubular portion 510 and the bracket portion 512 of the holding bracket 504 firmly against and within the workpiece 580.

Upon application of force F1 to the mandrel 506, the enlarged portion 594 of the mandrel 506 meets resistance from the shoulder 540 of the inner wall 536 such that the inner wall 536 is forced to expand radially outwardly as the enlarged portion 594 deforms to the size of the expanded inner wall 530, until the inner wall 536 reaches a diameter which allows for the mandrel 506 to continue to move into and through the tubular portion 510 of the bracket portion 512 of the holding bracket 504. As the inner wall 536 of the tubular portion 510 is inwardly tapered or stepped from the shoulder 540 to the second end 542 of the tubular portion 510, the enlarged portion 594 will consistently have an outer diameter which is larger than the diameter of the inner wall 536 of the tubular portion 510, even though the enlarged portion 594 deforms to assume the geometry relevant to the size of the expanded inner wall 536 of the tubular portion 510. Thus, the axial force F1 applied to the mandrel 506 will place a continuous exertion of radial expansion on the inner wall 536 of the tubular portion 510. As the inner wall 536 is continuously expanded by the mandrel 506, the outer wall 538 of the tubular portion 510 continuously expands radially outwardly within the aperture 582 against the aperture wall 588 of the workpiece, thus embedding the lobes 546*a*, 546*b* in the aperture wall 588 of the workpiece 580 in a fixed and intimate engagement with the aperture wall 588.

The angled portions 548*a* of the lobes 546*a* embed further into the aperture wall 588 of the workpiece 580 in comparison to the remainder of the lobes 546*a*, to provide improved torque-out of the holding bracket 504. As the high lobes 546*a* embed into the aperture wall 588 of the workpiece 580, material of the workpiece 580 is displaced between high lobes 546*a*. The displaced material, however, does not always fill the space between the high lobes 546*a* and, therefore, the low lobes 546*b* are provided to both take up space and act as a seal with the aperture wall 588 of the workpiece 580.

The enlarged portion 594 of the mandrel 506 will initially expand the tubular portion 510 as well as place a compressive load on the components to seat them against the top surface 584 of the workpiece 580. The tubular portion 510 will expand to engage the aperture wall 588 of the workpiece 580. As this occurs, radial forces are established which are sufficient to deform the enlarged portion 594 radially. Thus, the mandrel 506 can handle tolerance variations in the aperture 582 of the workpiece 580, and will continuously deform the tubular portion 510 radially outward to engage the aperture wall 588 with sufficient force to cause the lobes 546, or alternate structure, on the outer wall 538 of the tubular portion 510 to embed in the aperture wall 588 of the workpiece 580. As can be appreciated, the increasing wall thickness of the tubular portion 510 insures that radial deformation continues along the entire length of the tubular portion 510 to attain the desired degree of engagement of the lobes 546 in the aperture wall 588 such that improved torque-out, push-out and fatigue characteristics are achieved.

When the mandrel 506 is pushed or forced completely through the aperture 534 of the tubular portion 510, the inner wall 536 of the tubular portion 510 is no longer tapered, but rather is relatively straight such that it has a generally consistent diameter throughout the length of the aperture 534 from the point where the shoulder 540 was provided to the second end 542 of the tubular portion 510. Further, when the mandrel 506 is pushed or forced completely through the aperture 534 of the tubular portion 510, the holding bracket 504 is attached to the workpiece 580, as illustrated in FIG. 21. The mandrel 506, as it is deformed during the process of securing the holding bracket 504 to the workpiece 580, should be discarded.

With the holding bracket 504 attached to the workpiece 580, the retainer 508 allows for the nut 502 to float in an up and down direction and the recesses 556, 558 on the nut 502 and the protrusions 522, 524 on the holding bracket 504 allow for the nut 502 to float in a sideways direction, in order to permit alignment and attachment of a workpiece, such as a bolt, with the nut 502.

Thus, in the preferred embodiments, the members 106, 306, 506 are pushed through the apertures 134, 334, 534 of the tubular portions 110, 310, 510 from the first ends 114, 314, 514 thereof to the second ends 142, 342, 542 thereof. Conversely, if feasible, the members 106, 306, 506 could be pushed through the apertures 134, 334, 534 of the tubular portions 110, 310, 510 from the second ends 142, 342, 542 thereof to the first ends 114, 314, 514 thereof.

The axial force F1 applied to the members 106, 306, 506 in each of the operations for securing the nut plates 100, 300, 500 to the workpieces 180, 380, 580, respectively, is preferably performed by a tool 700. The tool 700 is illustrated in FIGS. 22-27.

The tool 700 preferably includes a push rod 702, a spring 704, a guide member 706 and a cage member 708.

The push rod 702 includes an enlarged head portion 710 and an elongated shank portion 712. The elongated shank portion 712 has a first end 714 and a second end 716. The first end 714 of the elongated shank portion 712 is associated with the enlarged head portion 710 such that the elongated shank portion 712 extends from the enlarged head portion 710. The elongated shank portion 712 has a diameter which is less than a diameter of the enlarged head portion 710 such that a shoulder 718 is defined between the enlarged head portion 710 and the elongated shank portion 712. The elongated shank portion 712 has a reduced diameter portion 720 proximate to the second end 716 thereof. The reduced diameter portion 720 of the elongated shank portion 712 is sized such that it is capable of being inserted into and through the aperture 154, 354, 554 of the nut 102, 302, 502 and the aperture 134, 334, 534 of the holding bracket 104, 304, 504 of the nut plate 100, 300, 500. The elongated shank portion 712 is preferably sized such that it is incapable of being inserted into and through the aperture 154, 354, 554 of the nut 102, 302, 502 and the aperture 134, 334, 534 of the holding bracket 104, 304, 504 of the nut plate 100, 300, 500.

The spring 704 is a normally expanded spring and is sized such that it winds around the elongated shank portion 712 of the push rod 702 and such that it is positioned below the enlarged head portion 710 of the push rod 702, such that the spring 704 may come into contact with the shoulder 718 of the push rod 702.

The guide member 706 is preferably a tubular member which has an aperture 722 which extends therethrough from a first end 724 thereof to a second end 726 thereof. The aperture 722 has a first diameter which is sized to receive the elongated shank portion 712 of the push rod 702 and, preferably, at least a portion of the nut 102, 302, 502. The aperture 722 has a second diameter which is sized to be positioned around the outer portions of the nut plate 100, 300, 500, namely the sidewalls 118, 120; 318, 320; 518, 520 of the bracket portions 112, 312, 512 of the holding brackets 104, 304, 504 and the side portions 170, 174; 370, 374; 570, 574 of the retainer 108, 308, 508. The second diameter of the aperture 722, the increased diameter portion 728, is provided proximate to the second end 726 of the guide member 706. A shoulder 730 is defined between the increased diameter portion 728 of the aperture 722 and the remainder of the aperture 722. The first end 724 is configured to be abutted against the spring 704.

The cage member 708 is used to retain the guide member 706 in proper position and is configured to generally encapsulate the guide member 706.

A base 732 is preferably used in conjunction with the tool 700 and is sized to have a diameter which is at least as large as an outer diameter of the tool 700, in other words, preferably, an outer diameter of the cage member 708 of the tool 700. The base 732 has a first end 734 and a second end 736 and an aperture 738 provided therethrough from the first end 734 to the second end 736. The aperture 738 is sized such that it can receive the members 106, 306, 506 once the members 106, 306, 506 have been forced through the aperture 134, 334, 534 of the tubular portion 110, 310, 510 by the push rod 702 of the tool 700.

Operation of the tool 700 will now be discussed with reference to FIGS. 6 and 23-25 and with regard to the installation of the nut plate 100 to the workpiece 180. Operation of the tool 700 with regard to the installation of the nut plates 300, 500 to the workpieces 380, 580, respectively, is not illustrated in detail as it is with regard to the installation of the nut plate 100 to the workpiece 180, but it is to be understood that the positioning and action of the tool 700 would be identical with regard to the installation of all of the nut plates 100, 300, 500 to the workpieces 180, 380, 580. FIGS. 13 and 20 illustrate the push rod 702 of the tool 700 applying an axial force F1 to the members 306, 506, respectively, as part of the installation process of the nut plates 300, 500 to the workpieces 380, 580.

In operation, the tool 700 is positioned such that the guide member 706 encases the nut plate 100 within the increased diameter portion 728 of the aperture 722 in order to center and align the position of the nut plate 100 within the workpiece 180 with the rest of the tool 700, mainly the push rod 702. The increased diameter portion 728 of the aperture 722 is sized and shaped such that the nut plate 100 just fits therein such that the nut plate 100 is prohibited from turning, from shifting from side to side, and from shifting from front to back. The bracket portion 112 of the holding bracket 104, and the retainer 108, are positioned within the increased diameter portion 728 of the aperture 722 of the guide member 706. The nut 102 is preferably at least partially positioned within the first diameter of the aperture 722. The shoulder 730 of the guide member 706 is positioned such as to generally prevent any upward movement of the nut plate 100, and to hold the nut 102, and thus the member 106, in place. The elongated shank portion 712 of the push rod 702 is positioned within the aperture 722 of the guide member 706 such that the reduced diameter portion 720 of the elongated shank portion 712 is positioned within the aperture 154 of the nut 102, but such that the second end 716 of the elongated shank portion 712 is distanced from the member 106. The shoulder 718 of the push rod 702 is distanced from the guide member 712 such that the spring 704 is positioned between the guide member 712 and the shoulder 718 of the push rod 702.

Figure 23:
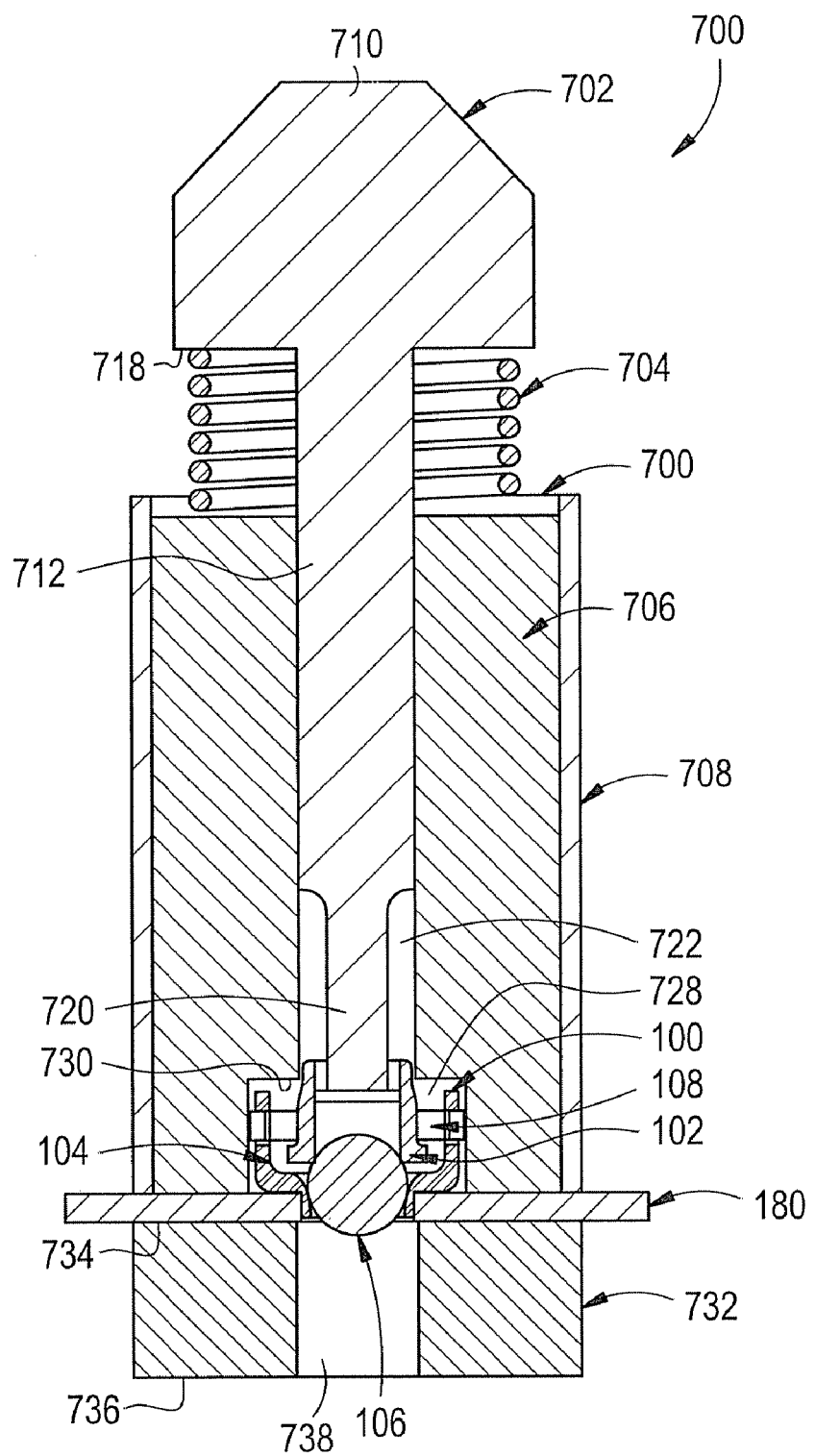
FIGS. 23-25 are side elevational cross-sectional views of the tool of the invention installing the nut plate of the first embodiment of the invention.
Figure 24:
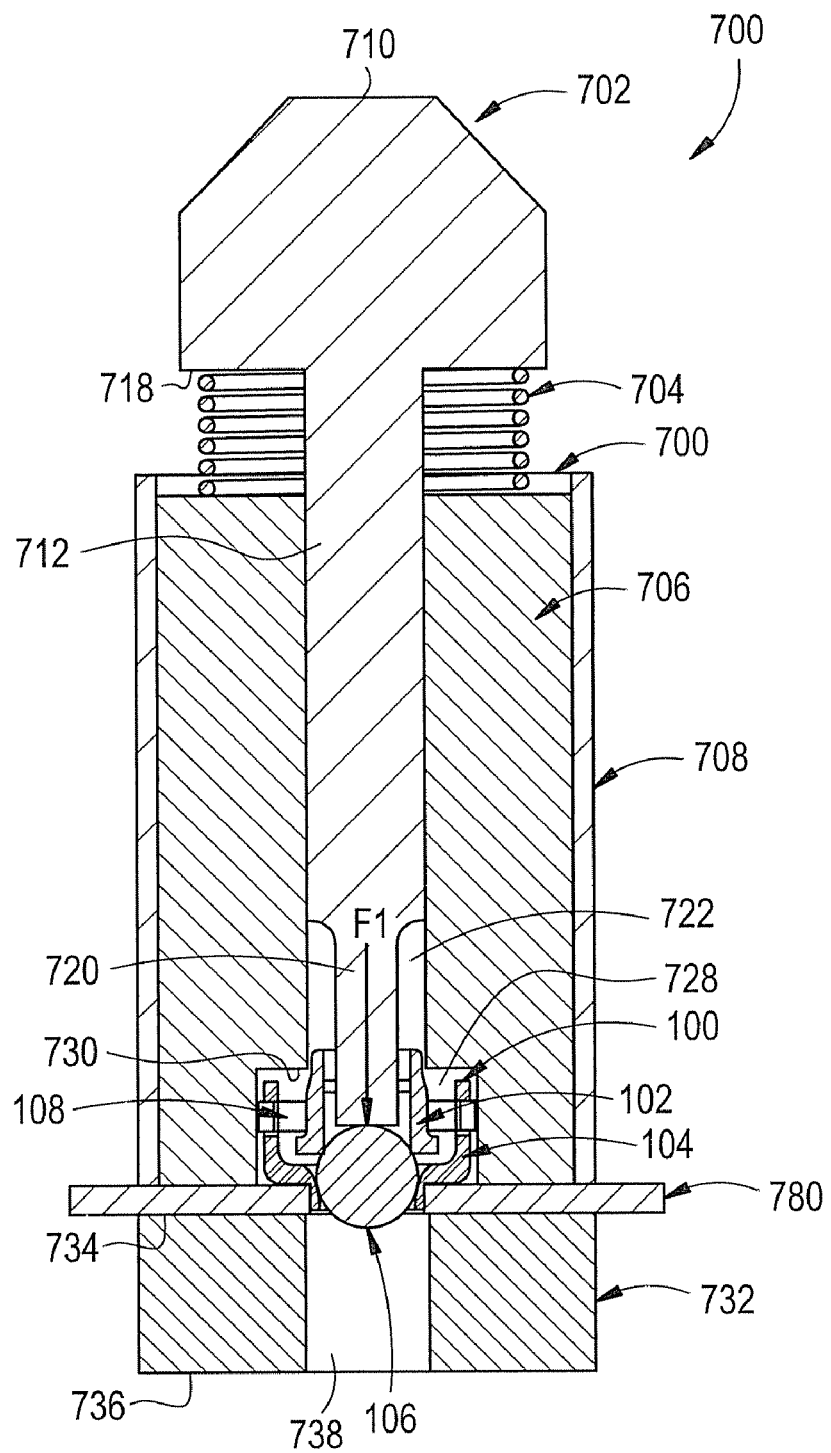

Once the tool 700 is properly positioned, as in FIG. 23, the push rod 702 is moved downward, as in FIGS. 6 and 24, such that the spring 704 is compressed between the shoulder 718 of the push rod 702 and the guide member 706 and such that the second end 716 of the push rod 702 abuts against the member 106 to force the member 106 through the aperture 134 of the tubular portion 110 of the holding bracket 104. The spring 704 is incorporated into the tool 700 to ensure proper seating and mating with the workpiece 180 as the push rod 702 will only be allowed to advance a certain distance until the spring 704 solids up such that it will allow no further movement of the push rod 702 in the direction in which the axial force F1 is applied.

Figure 25:
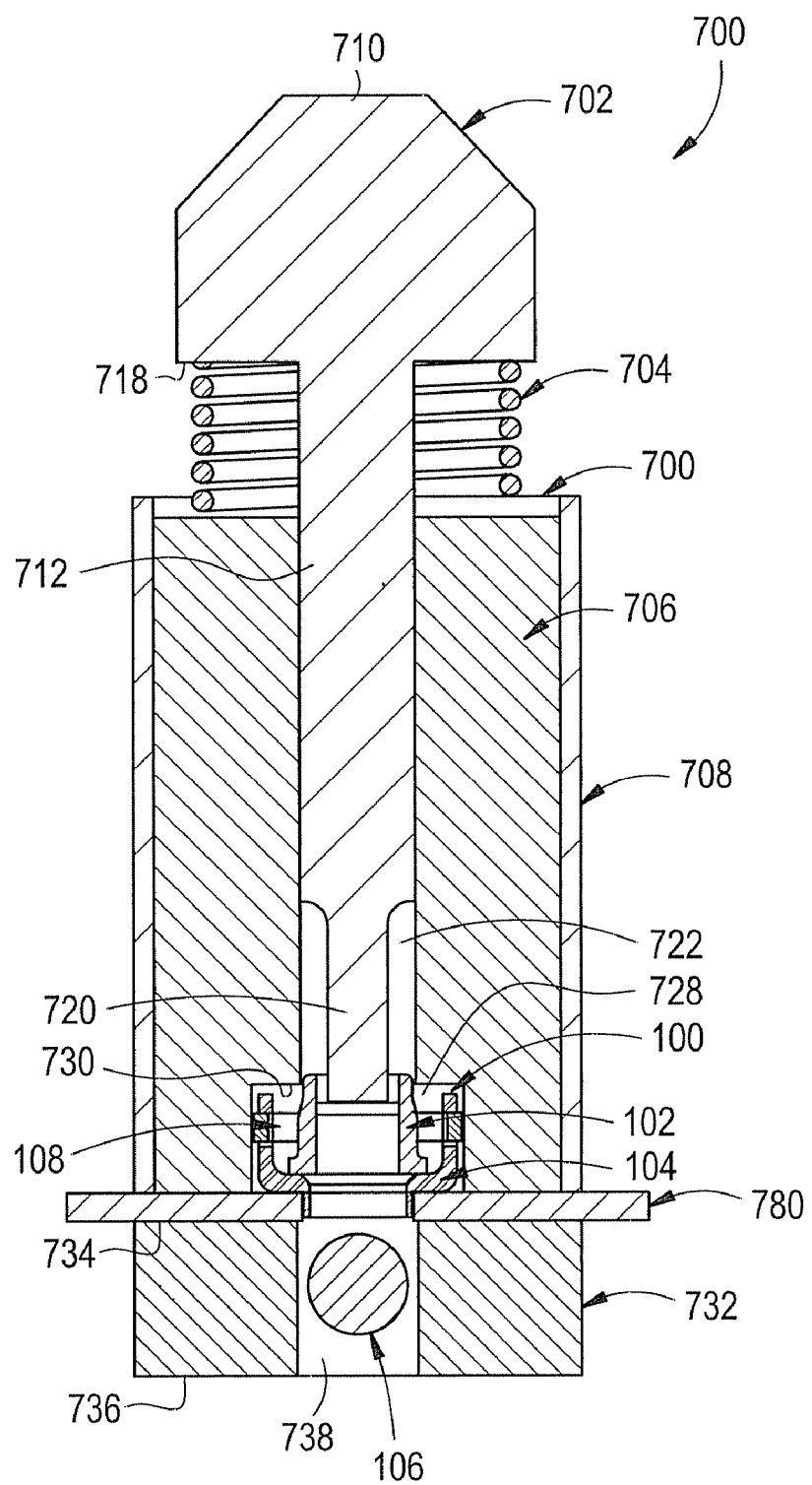
Figure 26:
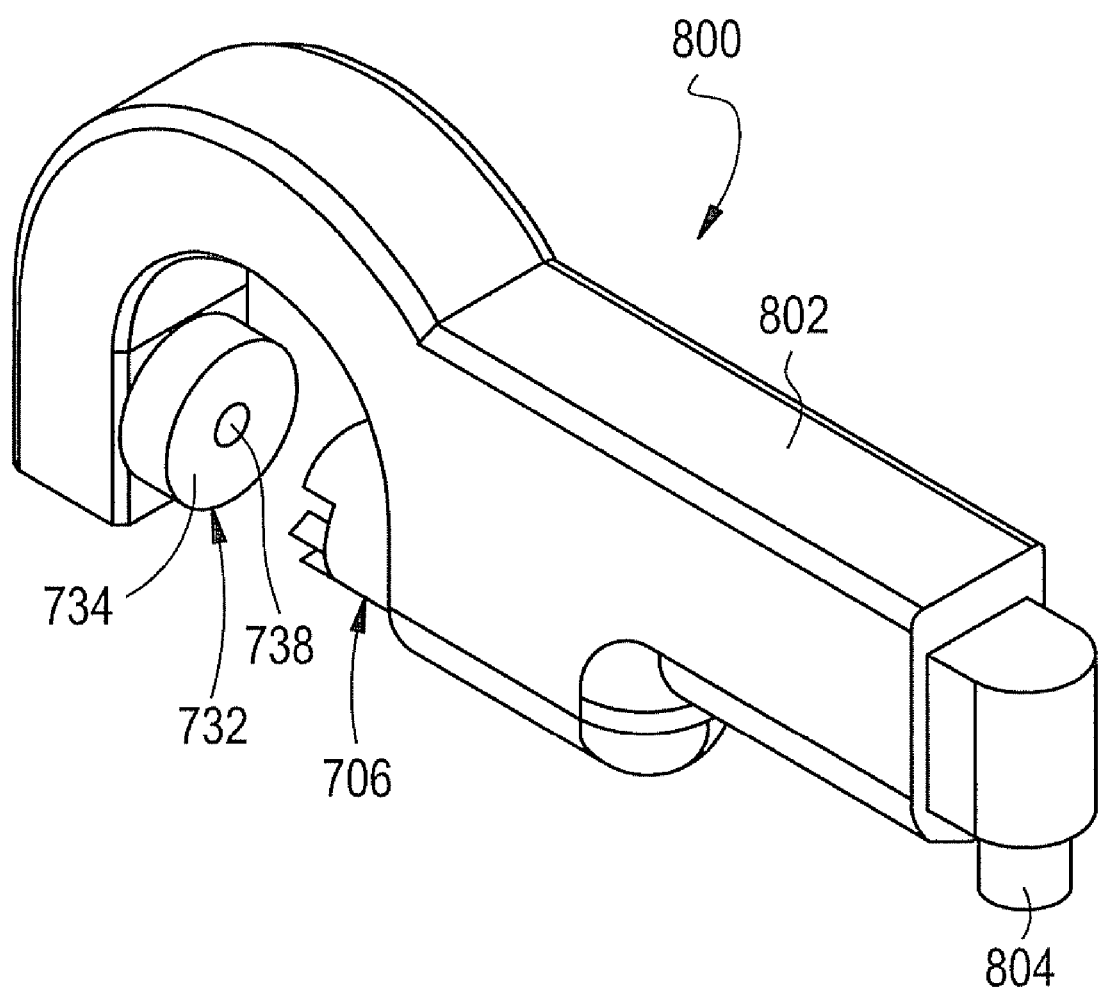
FIG. 26 is a perspective view of a handheld tool in which the tool of the invention can be incorporated into in order to install the nut plates of the different embodiments of the invention.
Figure 27:
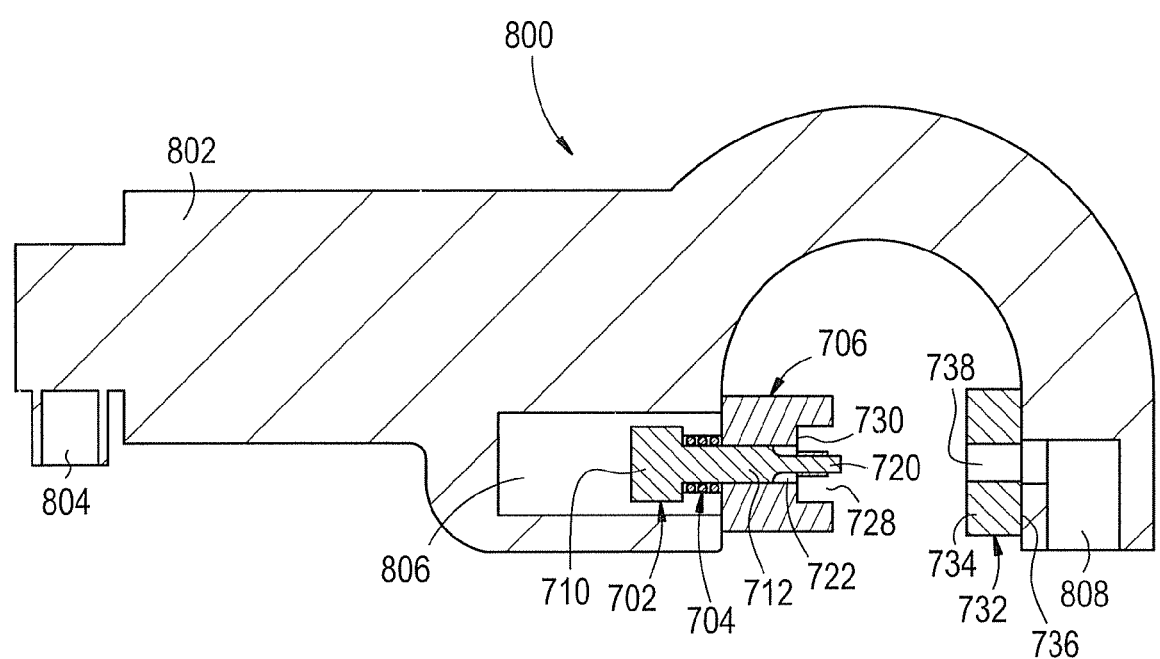
FIG. 27 is a cross-sectional view of the handheld tool illustrated in FIG. 26.

When the spring 704 prevents further movement of the push rod 702, the push rod 702 will have forced the member 106 through the aperture 134 of the tubular portion 110, as illustrated in FIG. 25, such that the inner wall 136 is expanded and such that the lobes 146 on the outer wall 138 of the tubular portion 110 are embedded into the aperture wall 188 of the workpiece 180. The push rod 702 will also then be retracted, allowing the spring 704 to move back toward its normally expanded state.

The tool 700 is then removed and the nut plate 100 is secured to the workpiece 180.

The tool 700 can be used in either a manual or an automatic process for installing the nut plates 100, 300, 500. When the manual process is utilized, the nut plate 100, 300, 500 is preferably manually placed into the aperture 182, 382, 582 of the workpiece 180, 380, 580. The aperture 182, 382, 582 of the workpiece 180, 380, 580 is aligned with the aperture 738 of the base 732. In the manual process, the tool 700 is preferably integrated into a handheld, hydraulic installation tool 800, such as that illustrated in FIGS. 26 and 27.

The handheld, hydraulic installation tool 800 includes a hydro-pneumatic handheld tool casing 802 having an input 804 for receiving shop air from a separate source. The tool casing 802 has a reservoir 806 for retaining hydraulic fluid therein. The tool 700 may be associated with the reservoir 806 of the tool casing 802 such that upon air pressure building up in the reservoir 806 which is routed to the reservoir 806 from the input 804, the hydraulic fluid within the reservoir 806 will force the push rod 702 to overcome the spring force of the spring 704, such that the push rod 702 may move through the guide and cage members 706, 708 (the cage member 708 is not illustrated in FIGS. 25 and 26 for clarification purposes) to push the members 106, 306, 506 through the tubular portion 110, 310, 510 of the holding bracket 104, 304, 504 in order to expand the tubular portion 110, 310, 510 such that the lobes 146, 346, 546 on the outer wall 138, 338, 538 of the tubular portion 110, 310, 510 become embedded into the aperture wall 188, 388, 588 of the workpiece 180, 380, 580, in order to secure the holding bracket 104, 304, 504 to the workpiece 180, 380, 580, as discussed in more detail hereinabove with regard to the operation of the first, second and third embodiments of the invention. The workpiece 180, 380, 580 is positioned against the base 732, which is secured to the tool casing 802. The installation tool 800 uses both a pneumatic and a hydraulic process in order to generate the force F1 that is necessary for the push type installation. The force F1 generally needs to be in the range of approximately 3,000 to 4,000 pounds.

Upon the member 106, 306, 506 being forced through the tubular portion 110, 310, 510 of the holding bracket 104, 304, 504, the member 106, 306, 506 moves through the aperture 738 of the base 732 and into a collection bin 808 provided in, or attached to, the tool casing 802. The collection bin 808 can then be accessed to remove the members 106, 306, 506 therefrom such that the members 106, 306, 506 can then be discarded or, in the case of the member 106, be reused in connection with other nut plates 100.

The tool 700 could also be used in a mechanical press type process or an automatic process for installing the nut plates 100, 300, 500. For example, the tool 700 could be implemented in an automated derailing and assembling machine such as Drivmatics. The automatic installation process could double as a robotic drilling process of the apertures 182, 382, 582 of the workpieces 180, 380, 580, as well as a push-type installation process with use of special End Effectors. The automatic process may have the nut plates 100, 300, 500 manually placed within the apertures 182, 382, 582 of the workpieces 180, 380, 580, or the automatic installation process may automatically place the nut plates 100, 300, 500 into the apertures 182, 382, 582 of the workpieces 180, 380, 580, which have been previously prepared.

Thus, the nut plates 100, 300, 500 of the first, second and third embodiments of the invention, along with the tool 700 of the invention provided for a number of advantages over prior art rivetless nut plates, which include, but are not limited to, the tool 700 of the invention providing for adaptability to installing the nut plates 100, 300, 500 in either a manual process or an automatic process; the nut plates 100, 300, 500 having a simplified design; the nut plates 100, 300, 500 allowing application of higher installation load values as the workpiece 180, 380, 580 may need; the nut plates 100, 300, 500 capable of being made in varying sizes with the size of the nut plates 100, 300, 500 to be installed limited only to the size of the machine or tool used to install the nut plates 100, 300, 500; and providing for lower costs with regard to materials used, weight for shipping, etc.

While preferred embodiments of the invention are shown and described, it is envisioned that those skilled in the art may devise various modifications without departing from the spirit and scope of the foregoing description.

The invention is claimed as follows:

1. A method of securing a nut plate to a wall defined by an aperture through a workpiece from a first side of the workpiece, said method comprising the steps of:
   a) providing a nut plate which includes a nut, a member having at least a portion thereof which has an increased diameter portion, and a holding bracket having a tubular portion having first and second ends and a bracket portion extending from said first end of said tubular portion, said tubular portion having an outer wall with lobes protruding outwardly therefrom, said tubular portion having an aperture provided therethrough which defines an inner wall of said tubular portion, said inner wall defining a shoulder proximate to said first end of said tubular portion;
   b) inserting said member into said aperture of said tubular portion from said first end of said tubular portion such that said increased diameter portion of said member is positioned on said shoulder of said inner wall of said tubular portion;
   c) placing said nut into said bracket portion;
   d) inserting said tubular portion into an aperture of a workpiece from a first side thereof such that an undersurface of said bracket portion is positioned on the first side of the workpiece;
   e) applying a force to said member in order to push said member through said aperture of said tubular portion such that said inner wall of said aperture is expanded to force said lobes on said outer wall to embed into a wall defined by the aperture of the workpiece to secure said tubular portion to the workpiece.

2. The method as defined in claim 1, wherein said force applied to said member is applied by a tool which has a push rod configured to extend into said aperture of said nut in order to apply said force to said member.

3. The method as defined in claim 1, wherein said inner wall is tapered from said shoulder to said second end of said inner wall such that said aperture of said tubular portion has a diameter at said shoulder thereof which is larger than a diameter of said aperture of said tubular portion at said second end thereof.

4. The method as defined in claim 1, further including the step of securing said nut within said bracket portion such that said nut is permitted limited movement within said bracket portion.

5. The method as defined in claim 1, wherein said force applied to said member is applied through said aperture of said nut.

6. A method of securing a preassembled nut plate to a wall defined by an aperture through a workpiece, said method comprising the steps of:
   a) providing a preassembled nut plate, said preassembled nut plate comprising,
      a holding bracket including a tubular portion and a bracket portion, said tubular portion having first and second ends with said bracket portion extending from said first end of said tabular portion, said tubular portion having an aperture provided therethrough,
      a member being at least partially positioned within said aperture of said tubular portion proximate to said first end thereof,
      a nut having an aperture therethrough, said nut being positioned within said bracket portion and being capable of being positioned on said member such that at least a portion of aid member is capable of being at least partially positioned within said aperture of aid nut, and
      means for securing said nut member within said bucket portion, said seeming means permitting limited movement of said nut within said bracket portion, said securement of said nut member within said bracket portion preventing substantial movement of said member such that said member cannot be removed from said tabular portion through said bracket portion;
   b) inserting said tubular portion of said holding bracket of said preassembled nut plate into an aperture of a workpiece such that an undersurface of said bracket portion of said holding portion of said preassembled nut plate is positioned on a top surface of said workpiece; and
   c) applying a force to said member in order to push said member entirely through said aperture of said tubular portion from said first end thereof to said second end thereof in order to expand said tubular portion such that mid tubular portion is secured to a wall defined by said aperture of said workpiece.

7. The method as defined in claim 6, wherein said force applied to said member is applied by a tool which has a push rod configured to extend into said aperture of said nut in order to apply said force to said member.

8. The method as defined in claim 6, wherein said force applied to said member is applied through said aperture of said nut.

9. A method comprising the steps of:
a) providing a nut plate having a nut, a holding bracket anti a member, said nut having an aperture extending therethrough, said holding bracket having a bracket portion and a tubular portion, said nut being positioned within said bracket portion, said tubular portion having inner and outer walls, said inner wall defining an aperture of said tubular portion, said member being positioned at least partially between said nut and said tubular portion;
b) inserting said tubular portion of said holding bracket into an aperture of a workpiece; and
c) pushing said member through said aperture of said tubular portion of said holding bracket from proximate said nut toward a free end of said tubular portion in order to expand said inner wall such that said outer wall is forced into engagement with a wall defined by the aperture of the workpiece.

10. The method as defined in claim 9, wherein said member is pushed through said aperture of said tubular member by a having a push rod configured to extend into said aperture of said nut in order to push said member.

11. The method as defined in claim 9, wherein said pushing of said member is performed through said aperture of said nut.

12. The method as defined in claim 9, further including the step of securing said nut within mid bracket portion such that said nut is permitted limited movement within said bracket portion.

13. The method as defined in claim 9, further including the steps of:
d) providing said outer wall of said tubular portion with a plurality of lobes extending outwardly therefrom;
e) pushing said member trout said aperture of said tubular portion of said holding bracket in order to expand said inner wall such that said plurality of lobes provided on said outer wall of said tubular portion are embedded into the wall of the workpiece.

14. The method as defined in claim 9, further including the step of:
d) partially positioning said member within said aperture of said nut.

* * * * *

UNITED STATES PATENT AND TRADEMARK OFFICE
CERTIFICATE OF CORRECTION

| | | |
|---|---|---|
| PATENT NO. | : 7,698,798 B2 | Page 1 of 1 |
| APPLICATION NO. | : 11/466872 | |
| DATED | : April 20, 2010 | |
| INVENTOR(S) | : Rahmatollah F. Toosky | |

It is certified that error appears in the above-identified patent and that said Letters Patent is hereby corrected as shown below:

Title Page, Item (56)    References Cited

U.S. PATENT DOCUMENTS

"1,136,345    A    5/1915    Zifferer" should be

-- 1,138,345    A    5/1915    Zifferer --

Column 13, Line 15 "nit plate 500" should be -- nut plate 500 --

Column 18, Line 36 "said tabular portion" should be -- said tubular portion --

Column 18, Line 44 "aid member" should be -- said member --

Column 18, Line 45 "of aid nut" should be -- of said nut --

Column 18, Line 47 "said bucket" should be -- said bracket --

Column 18, Line 48 "said seeming" should be -- said securing --

Column 18, Line 64 "mid tubular" should be -- said tubular --

Column 19, Line 7 "bracket anti" should be -- bracket and --

Signed and Sealed this

Twenty-third Day of November, 2010

David J. Kappos
*Director of the United States Patent and Trademark Office*